US006625601B1

(12) United States Patent
Molloy

(10) Patent No.: US 6,625,601 B1
(45) Date of Patent: *Sep. 23, 2003

(54) ESCROW-LOCKING MULTITHREADED PROCESS-PAIR RESOURCE MANAGER DICTIONARY

(75) Inventor: Mark E. Molloy, Knoxville, IA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/226,998

(22) Filed: Jan. 7, 1999

(51) Int. Cl.$^7$ .............................................. G06F 17/30

(52) U.S. Cl. ........................................ 707/8; 707/201

(58) Field of Search ........................ 707/8, 9, 10, 100, 707/533, 1–7, 201–202; 709/100–104, 220–234; 710/200–204; 711/119, 144–154

(56) References Cited

U.S. PATENT DOCUMENTS

| | | | | |
|---|---|---|---|---|
| 5,459,871 A | * | 10/1995 | Van Den Berg | 709/104 |
| 5,469,575 A | * | 11/1995 | Madduri | 709/226 |
| 5,504,899 A | * | 4/1996 | Raz | 707/10 |
| 5,551,046 A | * | 8/1996 | Mohan et al. | 707/8 |
| 5,687,365 A | * | 11/1997 | Velissaropoulous et al. | 707/102 |
| 6,012,094 A | * | 1/2000 | Leymann et al. | 709/230 |
| 6,105,026 A | * | 8/2000 | Kruglikov et al. | 707/8 |

OTHER PUBLICATIONS

John Kneiling et al. "Understanding CICS Internals", Copyright 1992, including Table of Contents and Database Management, Chapter 8, pp. 157–172, McGraw–Hill, ISBN 0–07–037040–0.

Helen Custer, "Inside Windows NT", Copyright 1993, including Summary of Contents, Table of Contents and Processes and Threads, Chapter Four, pp. 83–113, Microsoft Press, ISBN 1–55615–481–X.

(List continued on next page.)

*Primary Examiner*—Safet Metjahic
*Assistant Examiner*—Te Y Chen

(57) ABSTRACT

A dictionary in a distributed transaction processing system. The dictionary is implemented as an escrow-locking multi-threaded process-pair resource manager (PPRM) dictionary which is produced as an escrow-locking object implemented in the context of a PPRM and inheriting its functionality. A process pair in the PPRM is responsive to multiple concurrent transactions and including a concurrent aspect, a serial aspect and an escrow-locking dictionary. The concurrent aspect is a front-end multithreaded process of the process pair for concurrently servicing the multiple concurrent transactions. The serial aspect is a single-threaded process of the process pair for serializing the multiple concurrent transaction. Each of the concurrent aspect and the serial aspect includes an instance of the escrow-locking dictionary. That is, each of the concurrent aspect and the serial aspect has it own copy of the escrow-locking dictionary and, combined, the two copies maintains an appearance of a single virtual dictionary. The escrow-locking dictionary has a dictionary resource and uses escrow-locking for allowing the multiple concurrent transactions to share the dictionary resource. As a result, the dictionary performs operations on behalf of the multiple concurrent transactions without compromising their atomic, consistent, isolated and durable (ACID) properties. Additionally, a method and a computer program product, including a computer useable medium having computer readable code embodied therein, are for providing access to the dictionary in the data processing system.

65 Claims, 12 Drawing Sheets

OTHER PUBLICATIONS

Kay A. Robbins et al. "Practical UNIX Programming A Guide To Concurrency, Communication, and Multithreading", Copyright 1996, including Table of Contents and Part III Concurrency, pp. 289–427, Prentice–Hall, Inc., ISBN 0–13–443706–3.

Jim Gray et al. "Transaction Processing: Concepts and Techniques", Copyright 1993, including Table of Contents and pp. 62, 119–155, 159–187, 259–285, 193–312, 422–437, 464–481, 521–525, 833–947, Morgan Kaufman publishers, ISBN 1–55860–190–2.

* cited by examiner

ESCROW-LOCKING MULTITHREADED PROCESS-PAIR RESOURCE MANAGER DICTIONARY

RELATED APPLICATIONS

This application is related to and incorporates by reference the disclosure of U.S. Pat. No. 6,128,615 entitled "Process-Pair Resource Manager Implementation Of Object Biags" by Mark Edward Molloy, filed Jun. 17, 1997.

FIELD OF THE INVENTION

The present invention relates generally to object-oriented data management within a framework of distributed transaction processing computer systems. More specifically, the present invention is a method and apparatus for providing concurrent access to a dictionary in such computer systems.

BACKGROUND OF THE INVENTION

Dictionaries in data processing -systems include data structures in which entries may be key-searched, inserted, modified or deleted. Hereafter, data processing systems with dictionaries are referred to as "dictionary systems."

Object-oriented dictionary systems merge the capability of object-oriented programming languages and dictionary management functions. An object-oriented programming language is employed to handle the dictionary design, access and applications. In such object-oriented dictionary systems, dictionaries are a fundamentally useful type of programming objects. Thus, it is helpful to first understand the object abstraction concept.

A programming language is defined as object-oriented if it allows direct modeling of objects in the real world, such as dictionary entries, bank accounts information, product inventory, etc. Object-oriented programming also supports classes that allow inheritance, as will be further explained below.

Objects, as used in the context of object-oriented programming, are basic building blocks analogous to data structure types in other programming languages. Objects may be simple or complex in form. Simple objects are, for instance, integers, real numbers, a string of characters, an array of strings, pointers, etc. Complex objects, are defined as programmatic combinations of data elements and methods. In other words, such objects are generally defined as a programmatic combination of member data elements, possibly themselves simple or complex objects, and a set of member operations known as methods. Methods are internal algorithms that represent the internal implementation of an object and are performed by the object after receiving a message which is analogous to a function call. An object performing a method in response to a message produces an effect that may be remembered as a state of the object.

In object-oriented programming, classes are used to introduce new data structure types into a program. A class definition includes the keyword "class" followed by a name or tag of the class, which is used to represent the new data structure type. The class definition also includes an aggregation of data structures, possibly of different types, a set of algorithms and an external interface.

Classes describe an aggregation of objects, a set of methods, and messages. Each object is an instance, referenced by a name, of a certain class and all objects in a class share the same structure and respond to the same class message and methods. Objects can be passed by value as the argument and return type of a function. A pointer to an object can be initialized or assigned the result of a pointer operator.

Classes may form a hierarchy consisting of a root or base class at the top and its subclasses. The root or base class is a super-class to its subclasses, and each subclass is a super-class to its subclasses, if any. Each subclass inherits the functionality of all its super-classes in the hierarchy. By reason of the inheritance mechanism, subclasses need to define only aspects of their implementation that are different or in addition to the implementation of their respective super-classes.

The class abstraction provides a basic foundation for object-oriented programming. The classes themselves are objects that may be contained in variable instances of a program. As part of the class abstraction, objects and methods that occur in a public section of the class body provide the public interface of the class and can be accessed from anywhere within the main program. Objects and methods that occur in a protected or private section of the class body can be accessed only by the member methods of the class. In other words, private members of a class object can be manipulated only by the class object itself, or class objects declared as friends of the class object. This access restriction is referred to as information hiding or encapsulation.

An object-oriented program design, therefore, identifies the classes, or candidate abstractions, of the problem domain, and the supporting abstractions of the implementation, as well as the relationship between the classes. The object-oriented program design additionally identifies the interfaces to these classes. For example, an object-oriented dictionary design may identify the class hierarchy of dictionary entries and manipulation thereof, as well as the interface to these classes. Once, these abstractions are identified, a prototype implementation of the dictionary can proceed.

In a distributed transaction processing environment that implements an object-oriented dictionary (hereafter "dictionary"), the search, insert, modify, or delete operations are made within the framework of transactions launched by respective applications. Within this framework, the dictionary may be implemented as a transaction resource.

To understand the nature of transaction resources, it is helpful to first understand the transaction abstraction concept. A transaction is a unit of work characterized as a collection of operations for transforming a physical and abstract state of an application program in a transactional execution environment.

An application program is a static sequence of instructions. A process is a dynamic invocation of the application program along with the resources required for the application program to run. The process is essentially a running instance of the application program. The process is defined as having a thread and a state. The state is a value handled by the process and a memory space designated for the value. A thread is a unit of execution forming a flow of control within the process. A process may have one or multiple threads, and is accordingly referred to as a single-threaded process or multithreaded process, respectively.

A running instance of a transaction program is a process that services a class of transaction input messages. During transaction program runtime, a transaction is invoked by a thread of the respective process. Operations performed thereafter by the transaction program and other programs in service of the transaction program, are part of this transaction. The thread also calls for termination of this transaction.

A multithreaded process has multiple flows of control, or threads, sharing the same global state and taking turns in utilizing processor execution cycles. In a multithreaded process, each thread is associated with at most one transaction since no thread is associated with any transaction before beginning, between or after termination of transactions. When an application launches a multithreaded process, activities of the different transactions may interfere with each other.

Unfortunately, concurrency control does not protect against problems that occur if more than one transaction attempts to access the same data simultaneously. In traditional implementations, interference between transactions are managed by limiting access to a transaction resources to a single transaction at a time. Namely, to maintain consistency of the data in the transaction resource until the disposition (completion or failure) of the transaction is determined, traditional implementations lock the data to prevent more than one transaction from accessing it. Thus, only a single process or thread may access a particular dictionary at a particular time. It is easily appreciated, however, that the usefulness of the dictionary is greatly enhanced if it can perform work on behalf of multiple concurrent transactions. Specifically, provision of concurrent access ensures that the dictionary does not become a barrier that forces multiple concurrent processes to serialize.

SUMMARY OF THE INVENTION

In accordance with the purpose of the invention, as embodied and broadly described herein, the invention relates to a dictionary in a data processing system, and to a method and a computer program product, for providing access to the dictionary.

A preferred embodiment of the present invention provides the dictionary in a distributed transaction processing system. The dictionary is implemented as an escrow-locking multithreaded process-pair resource manager (PPRM) dictionary. The escrow-locking multithreaded PPRM dictionary is produced as an escrow-locking object implemented in the context of a PPRM and inheriting its functionality.

A process pair in the PPRM is responsive to multiple concurrent transactions and including a concurrent aspect, a serial aspect and an escrow-locking dictionary. The concurrent aspect is a front-end multithreaded process of the process pair for concurrently servicing the multiple concurrent transactions. The serial aspect is a single-threaded process of the process pair for serializing the multiple concurrent transactions. Each of the concurrent aspect and the serial aspect includes an instance of the escrow-locking dictionary. That is, each of the concurrent aspect and the serial aspect has it own copy of the escrow-locking dictionary and, combined, the two copies maintain an appearance of a single virtual dictionary.

The escrow-locking dictionary has a dictionary resource and uses escrow-locking for allowing the multiple concurrent transactions to share the dictionary resource. As a result, the dictionary performs operations on behalf of the multiple concurrent transactions without compromising their atomic, consistent, isolated and durable (ACID) properties.

In further accordance with the purpose of the invention, as embodied and broadly described herein, the invention provides a method and a computer program product, including a computer useable medium having computer readable code embodied therein, for providing access to the dictionary in the data processing system. In providing the access, the method and computer program product (hereafter collectively referred to as the "method and product") include providing the dictionary in the data processing system. The dictionary is implemented as an escrow-locking multithreaded process-pair resource manager (PPRM) dictionary and includes the concurrent aspect, the serial aspect, and the escrow-locking dictionary.

The method and product additionally include using in the dictionary exclusive and shared locking in response to access request messages and a distributed transaction processing two-phased commit protocol to process the access request messages. Furthermore, the method and product include keeping track in the operations performed in response of the access request messages on behalf of each of one or multiple concurrent transactions. The access request messages prompt a recording of the operations and reply messages in a per-transaction record in the order in which they are addressed by the concurrent aspect.

The method and product also include providing the per-transaction record for each transaction to the serial aspect. The serial aspect serializes and replays the multiple concurrent transactions to which the concurrent aspect is responsive using as an input their respective per-transaction records. The method and product further include keeping track in the dictionary of dictionary entries being accessed so that conflicting operations may be blocked until a transaction that perform these operations has completed them. As a result, the dictionary services the multiple concurrent transactions without compromising their atomic, consistent, isolated and durable (ACID) properties.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF A PREFERRED EMBODIMENT

Figure 1:
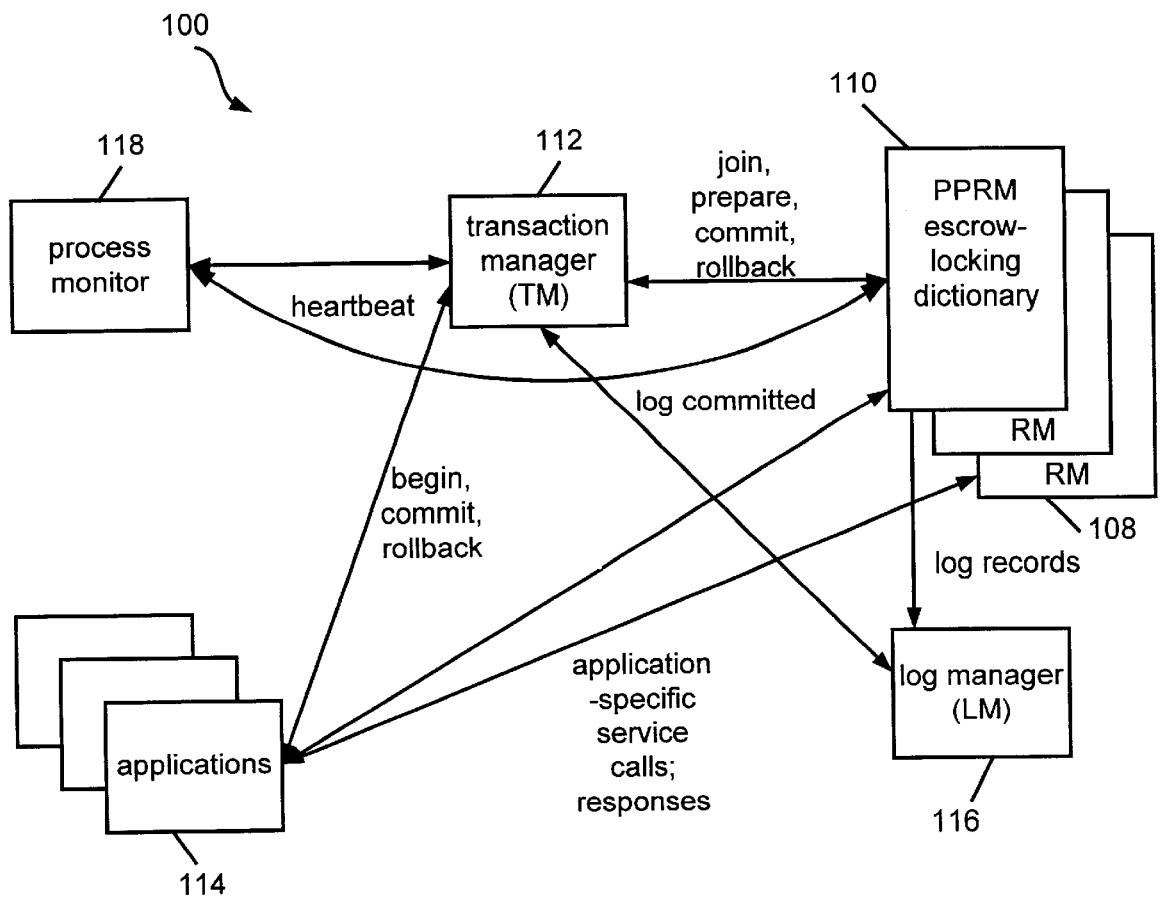
FIG. 1 illustrates a distributed transaction processing system environment in which an embodiment of a dictionary in accordance with the present invention can be implemented.

The present invention provides a dictionary implemented within the framework of distributed transaction processing in an object-oriented data management system. More specifically, the present invention is directed to a method, apparatus and computer program product, for providing the dictionary.

Reference will now by made in detail to a preferred embodiment of the invention, examples of which are illustrated in the accompanying drawings. Wherever convenient, the same reference numbers will be used throughout the drawings to refer to the same of like parts.

1. The Environment

A dictionary in accordance with a preferred embodiment of the invention is implemented within the framework of distributed transaction processing as an escrow-locking multithreaded process-pair resource manager (PPRM). The dictionary is implemented in an object-oriented data management system as transaction-protected resource that is responsive to multiple concurrent transactions.

Fundamentally, the dictionary is a type of escrow-locking programming object implemented in the context of a multithreaded PPRM and inheriting its functionality. The dictionary can be used as a first class-object as well as allowing sharing of its resources by multiple concurrent transactions. To accommodate the sharing, the dictionary uses escrow-locking to achieve transaction isolation so that it may participate in multiple transactions simultaneously, without necessarily blocking transactions' access.

As a first-class object, the dictionary can be a component of other objects, including as an element of other dictionaries. Also, the dictionary can use other objects as entries, can be passed as a parameter, etc.

The dictionary is an object that generally allows the storage and lookup of values in correspondence with external key values. In the context of distributed transaction processing, the dictionary uses escrow-locking to allow the storage and lookup of values on behalf of multiple concurrent transactions. The dictionary may be one of a language dictionary, a programming language translator or compiler, a relational database system, etc. For example, the dictionary may be a relational database system for creating, updating and querying information on behalf of multiple concurrent transactions, where keys are used to access dictionary entries or records. Such a relational database system uses escrow-locking in the form of record-level locking, to simultaneously perform these operations on behalf of multiple concurrent transactions without necessarily blocking transactions.

It may be recalled that a multithreaded process has multiple flows of control, or threads, sharing the same global state and taking turns in utilizing processor execution cycles. Each thread in the multithreaded process, is associated with a transaction which may be one of multiple transactions requiring simultaneous access to the dictionary for performing the storage and lookup of values. A concurrency control scheme is therefore implemented to coordinate the activities of the different transactions so that they do not interfere with each other.

The concurrency control scheme is required for allowing multitasking in object-oriented data management within the framework of transactions. The concurrency control involves having each transaction both find and leave a dictionary, which is a transaction protected resource, in a consistent state.

Such concurrency control scheme requires, for instance, that the set of operations performed by each transaction either commit or abort as a unit. Fundamentally, this concurrency control demands that each transaction perform a unit of work that is 1) "atomic," 2) "consistent, " 3) "isolated," and 4) "durable" (hereafter, these attributes are referred to as the "ACID properties"). The dictionary extends the semantics of ACID properties to the process state of a process pair of the PPRM, and performs this work concurrently on behalf of multiple transactions.

To be "atomic" the transaction must complete in an all-or-none fashion. This means that the transaction-protected resource must reflect all changes made by the transaction if it successfully completes or "commits." It also means that a transaction-protected resource must reflect none of the changes made by the transaction if it fails to commit for any reason.

To be "consistent" the transaction must move the transaction-protected resource from one consistent state to another. In systems that use the transaction abstraction, consistent states are defined in terms of rules known as "integrity constraints." Transactions that violate these integrity constraints are aborted. In this way, transaction-protected resources are maintained in consistent states. For example, in a product inventory database, an integrity constraint could be used to abort any transaction that would result in a negative quantity of any product.

To be "isolated," the changes made to transaction-protected resources must be invisible to threads and processes that are not associated with the transaction until the transaction has committed. Isolation is achieved by escrow-locking the changed resource and forcing threads and processes that attempt to read or update the locked resource to wait until the transaction has completed.

Finally, to be "durable," the changes made to transaction-protected resources must not be lost or corrupted, even in the case of a catastrophic system failure. In this context, durability is not used in the absolute sense. For example, physically destroying the transaction processing computer system and all of its backup records will violate the durability property.

The concept of a multithreaded process with transactions having ACID properties is used in the implementation of the dictionary as a reliable transaction-protected resource. The implementation of the dictionary as a transaction-protected resource enhances the overall reliability of the dictionary and, in turn, the overall reliability of an object-oriented data management system which embodies the dictionary.

As stated before, the dictionary extends the semantics of ACID properties to the process state of a process pair of the PPRM, and performs this work concurrently on behalf of multiple transactions. The dictionary is capable of fulfilling the requirements of a process-pair resource manager two-phased commit protocol of distributed transaction processing. To facilitate the two-phased commit protocol, the dictionary is configured to keep a per-transaction record of transaction operations in the order in which they are performed. The escrow-locking aspect of the dictionary implementation includes shared and exclusive locking of dictionary key-to-entry mapping connection points in order to shield transactions and, thereby, prevent transaction cross-contamination.

Namely, the dictionary is implemented as an escrow-locking multithreaded PPRM dictionary that services multiple concurrent transactions without compromising their ACID properties. A plurality of these transactions may perform non-conflicting operations simultaneously on the dictionary. Conflicting operations on behalf of one transaction are blocked to allow completion of preceding conflicting operations on behalf of other transactions. In this context, conflicting operations include, for example, operations using the same key to modify different dictionary entries.

FIG. 1 illustrates a distributed transaction processing system environment 100 in which an embodiment of a dictionary can be implemented. In this environment 100 a software program called a process monitor 118 monitors the heartbeat of each PPRM, e.g., 108 and 110, and restarts any PPRM which stops for any reason. Also in this environment, one or more than one application 114 is executed.

Each application 114 sends begin, commit or rollback request messages to a software program referred to as a transaction manager (TM) 112. More particularly, during runtime of an application 114, a thread of the application 114 declares a new transaction message by sending a begin transaction message to the TM 112. In response, the TM 112 invokes a begin-transaction method. Thereafter, operations performed by the thread of the application 114 and other programs in service of the application 114, are part of this transaction. This thread of application 114 also declares the transaction to be a complete and correct state transformation by invoking commit-transaction( ), or causes the transaction to undo the state transformation by invoking roll-back-transaction( ) if a failure occurs during the transaction.

The environment 100 includes as a special RM the dictionary 110 that, in accordance with the invention, is implemented as an escrow-locking multithreaded PPRM dictionary. The environment 100 may also include one or more than one resource manager (RM), e.g., 108. After a particular transaction is initiated, the first time a thread of an application 114 sends a request message to the dictionary 110, it joins as a participant in the transaction by sending a join request to the TM 112. Similarly, the first time a thread of an application 114 sends a request message to the RM 108, it joins as a participant in the transaction by sending a join request to the TM 112.

Upon beginning a transaction, the TM 112 creates a unique transaction identifier (hereafter "transaction-id"). The TM 112 then tracks which RM, e.g., 110 and/or 108, participates in the transaction. The TM 112 also orchestrates the transaction operations (prepare) and the transaction commit or rollback.

A log manager (LM) 116 provides for recording of transaction messages and outcomes by interacting with the TM 112 and the special and conventional RM's 110 and 108, respectively. The LM 116 helps the dictionary to provide the durability property—one of the ACID properties.

Figure 2:
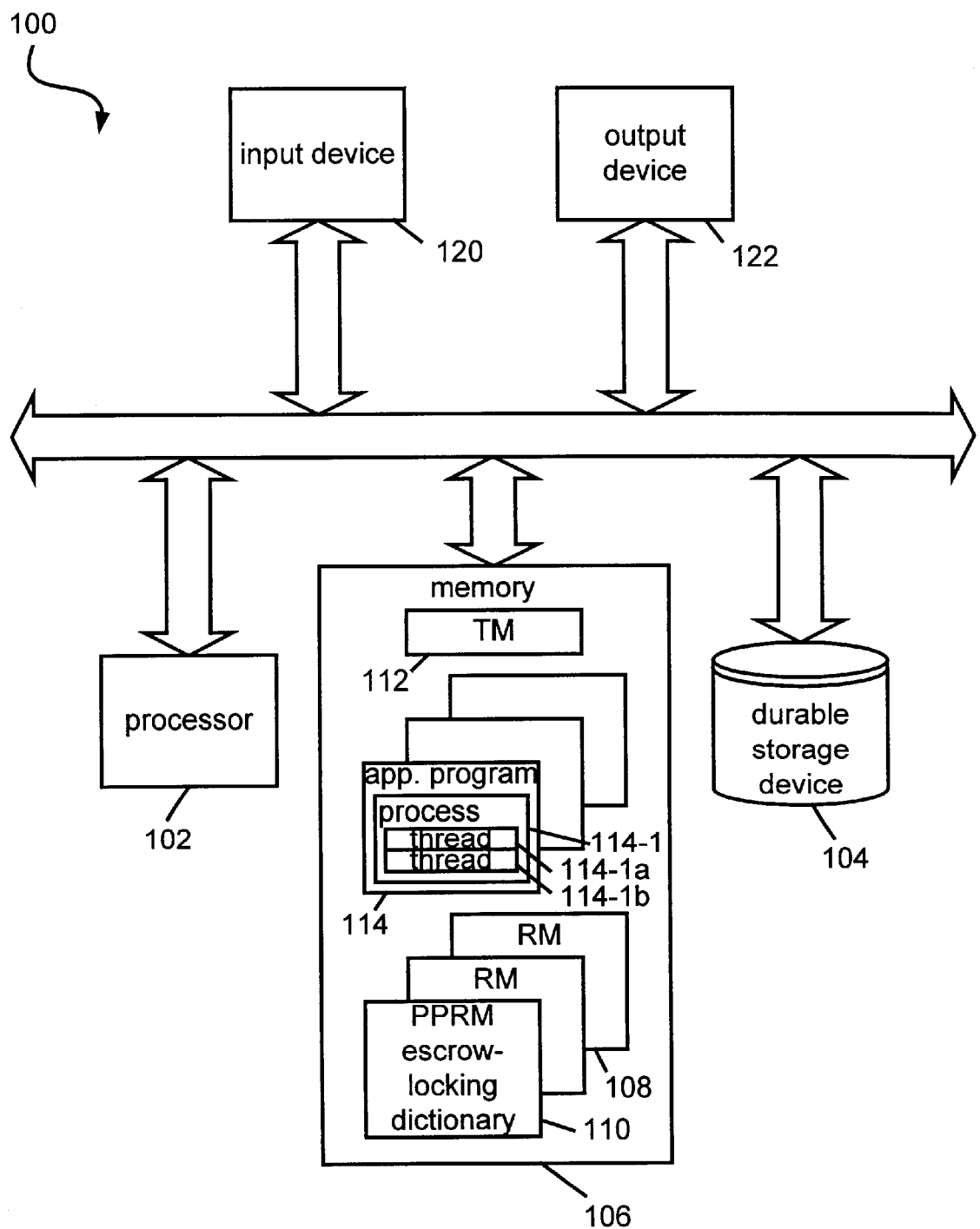
FIG. 2 is a block diagram of an exemplary distributed transaction processing system embodying a preferred embodiment of the present invention.

FIG. 2 is a block diagram of the distributed transaction processing system environment 100 (hereafter referred to as the "system"). The system 100 includes a processor 102, input and output devices 120 and 122, respectively, a durable storage device 104 and a memory 106. In the aftermath of a system failure, or after a system shutdown, data is maintained in the durable storage device without compromise of its integrity.

The functionality of the system 100 is managed by the processor 102 and is typically governed by an operating system (OS, not shown). The OS and software programs, e.g., 114, running under the OS each comprise computer readable instructions which, in general, are tangibly embodied in or are readable from a computer program media or product such a memory 106, a durable storage device 104, or a data interface device (not shown). When executed by the system 100, the instructions cause the system to perform the steps necessary to implement the invention. Thus, the invention may be implemented as a method, apparatus, or an article of manufacture (computer program product) using programming and/or engineering techniques to produce software, firmware, hardware or a combination thereof.

Software programs (hereafter "programs") running under the operating system are frequently stored or downloaded into the memory 106. Programs defining the functionality of the system 100 include the TM 112, transactional application programs; 114, an RM 108, and the dictionary 110, which is implemented as an escrow-locking multithreaded PPRM dictionary. A dynamic invocation of an application, e.g., 114, creates a process, e.g., 114-1. Each process 114-1 may be multithreaded, e.g., 114-1a and 114-1b. The association between these programs will be further explained below.

2. The Escrow-Locking Multithreaded PPRM Dictionary

Figure 3:
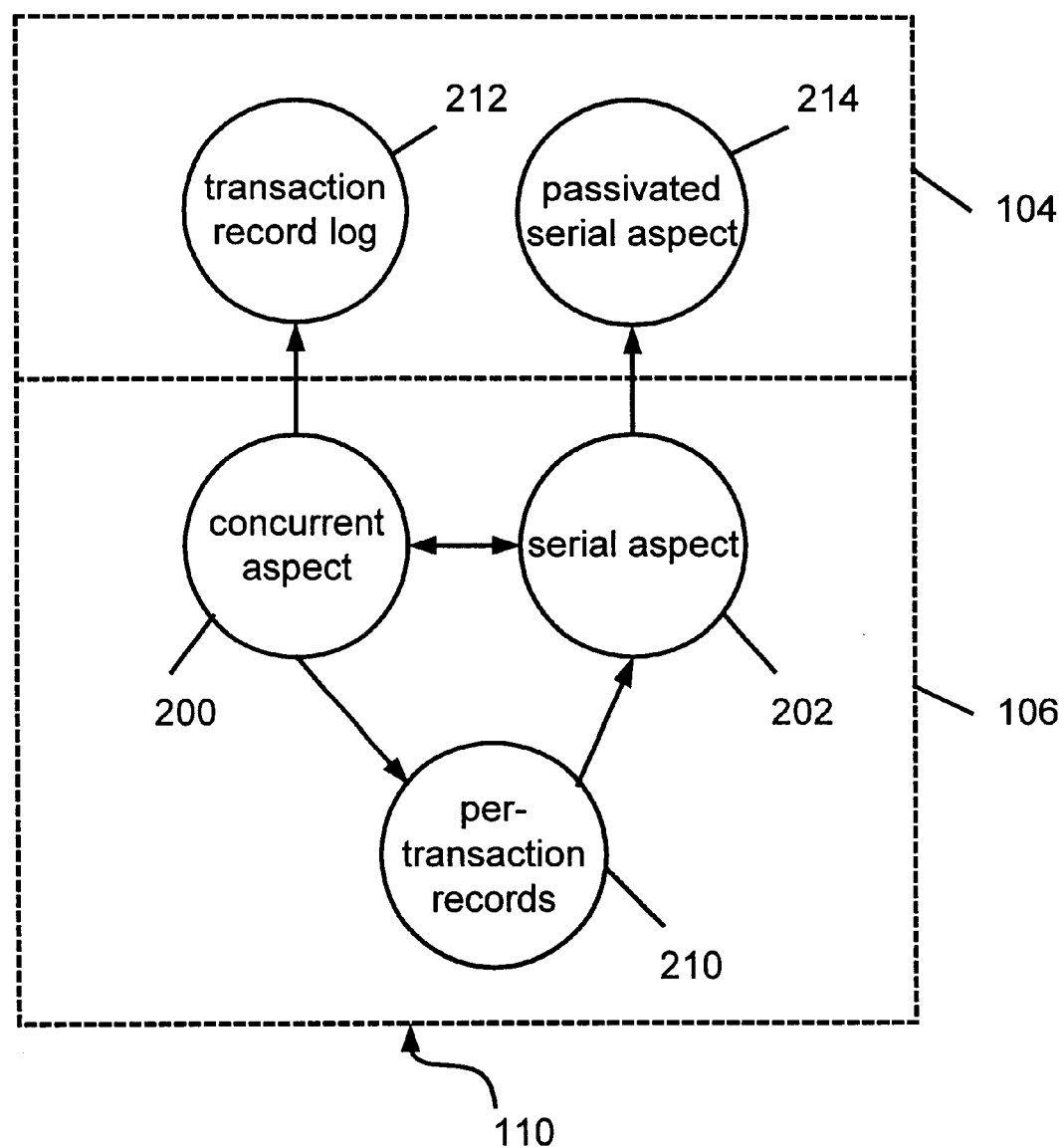
FIG. 3 illustrates structural elements used to implement the dictionary.

FIG. 3 illustrates the structural elements used to implement the dictionary. The dictionary includes a first process referred to a the "concurrent aspect" 200, a second process referred to as the "serial aspect" 202, per-transaction records 210, a transaction record log 212 and a periodic snap-shot of the serial aspect referred to as the "passivated serial aspect" 214. Together, the concurrent aspect 200 and the serial aspect 202 form the process-pair of the escrow-locking multithreaded PPRM dictionary.

In the illustrated embodiment, the concurrent aspect 200, serial aspect 202, and per-transaction records 210 are resident in the memory 106. The transaction record log 212 and passivated serial aspect 214 are resident in the durable memory 104.

Figure 4:
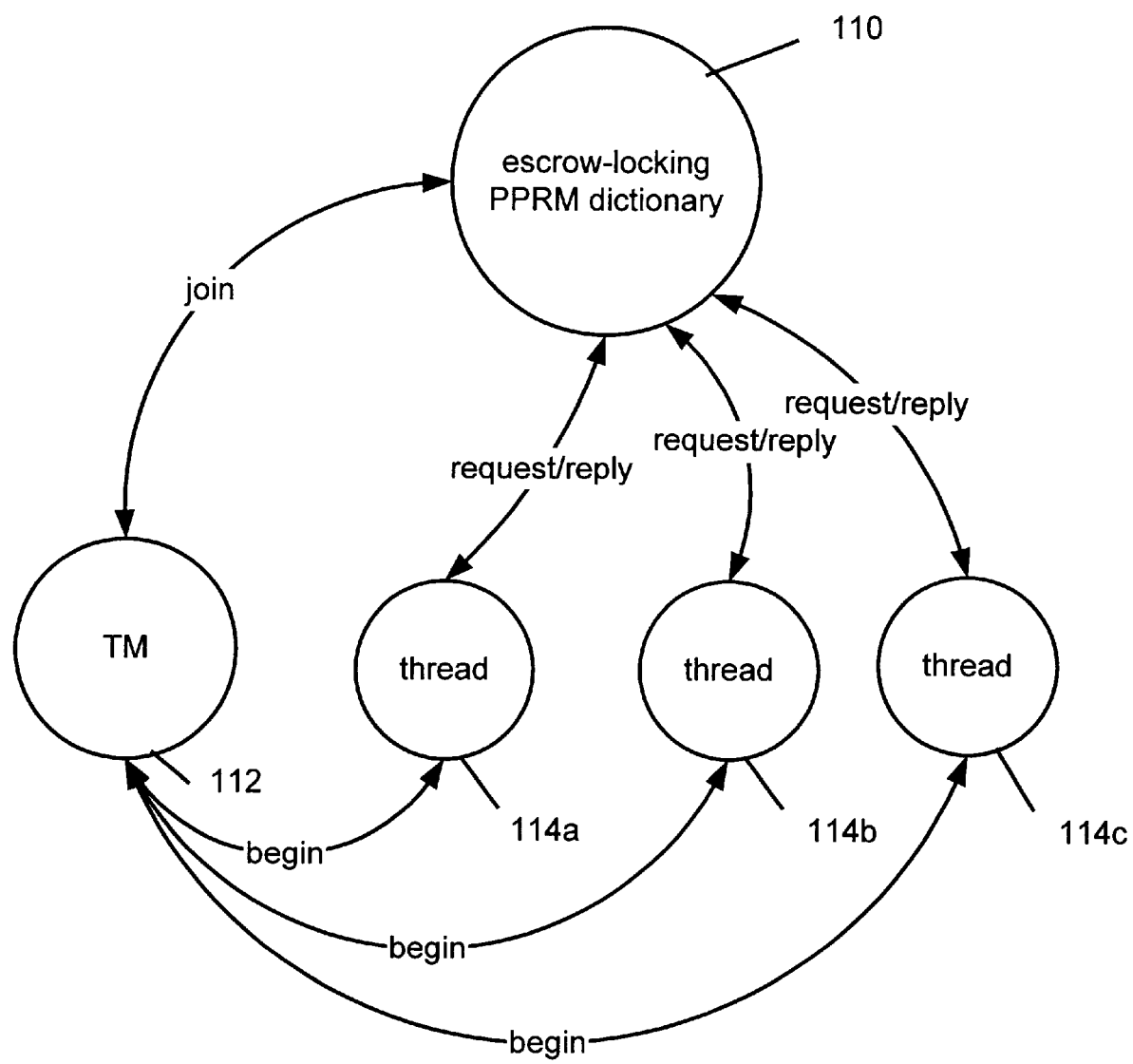
FIG. 4 illustrates the relationship between the dictionary in accordance with the invention, multiple threads and a transaction manager.

The dictionary includes a dictionary resource which may be accessed by multiple concurrent transactions. FIG. 4 illustrates the relationship between the dictionary 110, the threads, e.g., 114a through 114c, and the TM 112. Each of the representative three threads 114a through 114c, initiates a new transaction prior to accessing the dictionary resource in the dictionary 110 by sending the TM 112 a begin transaction message. Each of the threads 114a through 114c gains access to the dictionary 110 by launching a separate transaction. The TM 112, in turn, assigns a transaction-id to each transaction. Subsequently, the threads 114a through 114c send request messages to the dictionary 110 including, for example, lookup, insert and delete which respectively lookup, insert or delete a dictionary entry in the dictionary resource. The first time each thread sends a request message to the dictionary 110, it joins as a participant in the transaction by sending a join request to the TM 112. The dictionary 110 also sends reply messages to the threads 114a through 114c.

Figure 5:
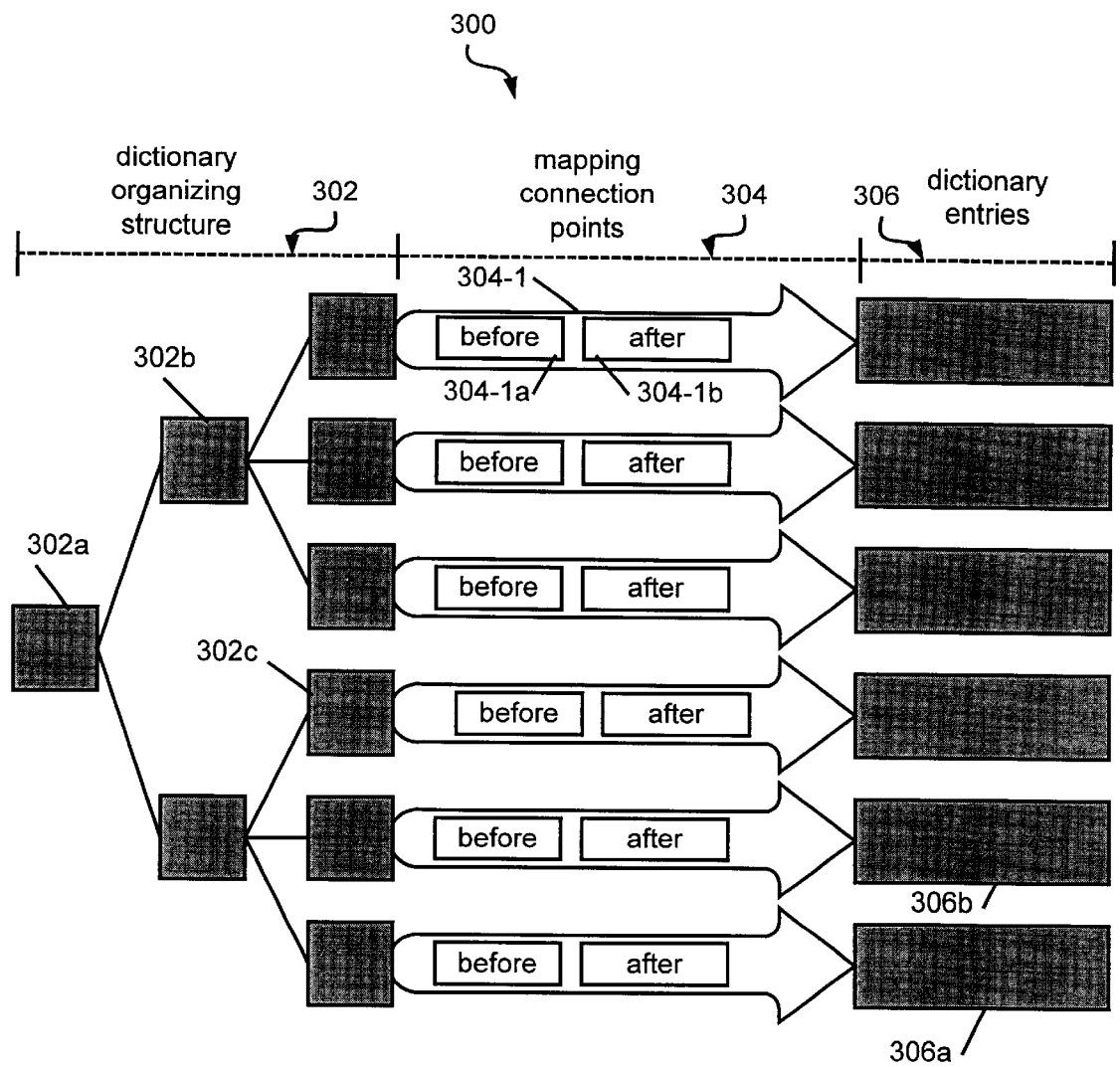
FIG. 5 shows a representative structure of the dictionary resource.

FIG. 5 shows a representative structure of the dictionary resource 300. The illustrated dictionary resource 300 includes a dictionary organizing structure 302 and dictionary entries 306. The dictionary organizing structure 302 preferably forms a binary tree or hash table, starting with a root or base key 302a, and branching to other keys, e.g., 302b and 302c. The dictionary organizing structure 302 facilitates the search or deletion of preexisting keys as well as the insertion of new keys. The dictionary entries 306 represent a plurality of distinct entries, e.g., 306*a*, or, alternatively, a plurality of distinct entry groups, e.g., 306*b*.

In this dictionary resource 300, mapping connection points 304 establish key-to-entry, or key-to-entry-group, relationships or connections. However, it can be readily appreciated that, without departing from the scope and spirit of the invention, the dictionary may, alternatively, have a dictionary resource structure in which the keys and dictionary entries are united; that is, the dictionary entries 306 are contained in the dictionary organizing structure 302. In this case, mapping connection points 304 are unnecessary.

Each mapping connection point, e.g., 304-1, preferably includes a corresponding 'before' field 304-1*a* and a corresponding 'after' field 304-1*b*. These fields 304-1*a* and 304-1*b* may be introduced as individual field objects, an array object, etc.

The 'before' field, e.g. 304-1*a*, is used for maintaining an entry value of a previous dictionary entry to which a respective mapping connection point links a particular key in order to guarantee the ACID properties in case of a transaction rollback. For example, unsuccessful insert operations cause a transaction rollback and the 'before' filed 304-1*a* is used in this case to revert the dictionary resource 300 state to a pre-transaction condition. Namely, in case of a rollback, the 'after' field 304-1*b* will receive the value of the 'before' filed 304-1*a*, thereby reverting its state to the entry value which represents the previously inserted dictionary entry. This feature will be further discussed below with reference to the 'insert' method illustrated in FIG. 10.

In accordance with a preferred embodiment of the invention, the dictionary is embodied in an object-oriented data management system operating within a distributed transaction processing system framework. The dictionary is a type of escrow-locking programming object implemented in the context of a multithreaded PPRM and inheriting its functionality. The dictionary can be used as a first class object as well as allowing the sharing of its resources by multiple concurrent transactions. Hence, the dictionary is a special kind of RM implemented as an escrow-locking multithreaded PPRM dictionary.

In this context, the dictionary is a programming object (hereafter "object") including objects and methods, as well as, messages to which it responds and reply messages. The objects and methods form the structural and functional elements of the escrow-locking multithreaded PPRM dictionary. The dictionary includes the dictionary resource, the structural and functional elements of a multithreaded PPRM, and the escrow-locking capability which influences access to the dictionary resource.

Figure 6:
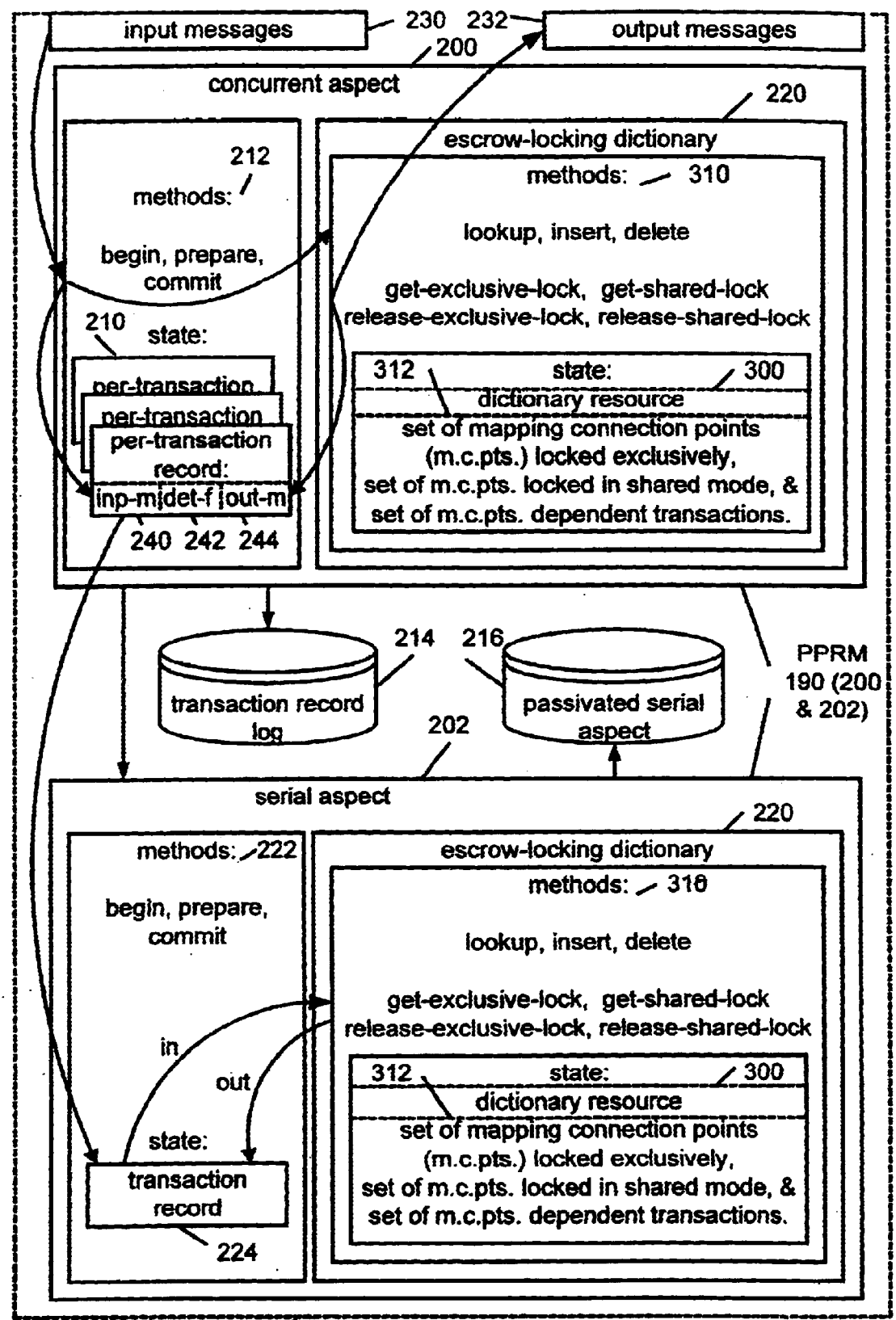
FIG. 6 provides a more detailed illustration of the dictionary in accordance with a preferred embodiment of the invention.

FIG. 6 provides a detailed illustration of the dictionary 110. It should be noted that the dictionary object may be implemented in various ways commensurate with proper programming and engineering techniques without departing from the scope and spirit of the invention. Referring, for example, to a preferred embodiment of the dictionary object which introduces the dictionary 100. As illustrated, the concurrent aspect 200 and serial aspect 202 are the process-pair of the multithreaded PPRM 190. The concurrent aspect 200 is a multithreaded process and the serial aspect 202 is a single-threaded process.

Each of the concurrent aspect 200 and the serial aspect 202 includes an instance of an escrow-locking dictionary. That is, each of the concurrent aspect 200 and the serial aspect 202 has it own copy of the escrow-locking dictionary 220 and, combined, the two copies maintain an appearance of a single virtual dictionary. Each instance of the escrow-locking dictionary 220 contains an object representing the dictionary resource. The escrow-locking dictionary will be discussed in detail below.

The escrow-locking multithreaded PPRM dictionary is implemented by having the same program operations executed in the concurrent aspect 200 and a serial aspect 202, using the same input messages to determine their actions. However, the two processes do not perform these same operations simultaneously. Moreover, the two processes do not perform these operations in exactly the same fashion. The concurrent aspect 200, being a multithreaded process, services multiple concurrent transactions in a non-deterministic manner. The serial aspect 202, being a single-threaded process, serializes the multiple transactions and services each of them in a deterministic manner.

The concurrent aspect 200 (the front-end process of the pair) receives transaction request messages from threads (shown as input messages 230). Concurrent aspect 200 responds to messages via its methods 212. The concurrent aspect 200 reply messages are shown as output messages 232. For each transaction, the concurrent aspect 200 also creates a per-transaction record 210.

Each per-transaction record 210 contains a time-sequenced set of input message(s) 240, output message(s) 244, and determining factors 242. The input messages 230 are recorded by the concurrent aspect 200 in the set of input message(s) 240 in the order in which they are received from a thread that is associated with the particular transaction. The output messages 232 are recorded in the set of output message(s) 244 in the order in which they are generated by the concurrent aspect 200 in reply to the input messages 230.

The concurrent aspect 200 is so named because it can support multiple concurrent transactions (with actual processing being either simultaneous or interleaved). Moreover, each transaction that the concurrent aspect 200 participates in is associated with a group of threads each of which is involved in sending the request messages to the concurrent aspect 200. When the concurrent aspect 200 receives a transaction request message, it switches to the appropriates thread to process the request.

The serial aspect 202 participates in each transaction which commits by forward-playing the transaction, but the serial aspect 200 does not begin until the concurrent aspect 202 and, in turn, the serial aspect 202 are prompted to execute the 'prepare' method 212 and 222, respectively. Instead of transaction request messages, the serial aspect 202 uses as inputs the per-transaction record 210 for each transaction it forward-plays.

In particular, the serial aspect 202 uses as inputs the time-sequenced input messages from the per-transaction record 210 to perform a deterministic forward-play of the entire transaction. Preferably but not necessarily, in preparing for the forward-play of a transaction, its per-transaction record 210 is reproduced as a transaction record 224 in the serial aspect 202. By reading and processing the recorded time-sequenced set of input message(s) 240, the serial aspect 202 produces results which it then compares with the recorded time-sequenced set of output message(s) 244 in order to maintain consistency which is one of the ACID properties.

Being implemented as an escrow-locking multithreaded PPRM, the dictionary 110 acts as a special RM in a two-phase commit protocol. As such, the dictionary 110 prevents cross contamination between transactions processing in separate threads, by guaranteeing that transactions can commit or rollback independently, and by guaranteeing serialized replay of transactions that commit in the "prepare" order and with identical results.

The determining factors 242 are a record of the time-sequenced path ;a non-deterministic method in the concurrent aspect 200 actually executed. By retrieving these determining factors 242, the serial aspect 202 is able to deterministically forward-play transactions which, originally, were performed non-deterministically by the concurrent aspect 200. Additionally, the serial aspect 202, being a single-threaded process, forward-plays transactions in their entirety. Hence, the processing of multiple transactions in the serial aspect 202 is serialized rather than interleaved. By definition this serialization guarantees that effects of the transaction are being isolated—a key ACID property.

It is noted that "primary" and "backup" (or "secondary") are not suitable terms for describing the concurrent and serial aspects 200 and 202, respectively. As a process pair, both the concurrent aspect 200 and serial aspect 202 participate in each transaction, and neither one of them functions as a primary or backup process. In fact, since the concurrent aspect 200 operates in concert with the serial aspect 202, this process pair performs the escrow-locking PPRM dictionary functions that fulfill the requirements of a resource manager two-phase commit protocol of distributed transaction processing.

The escrow-locking multithreaded PPRM dictionary is implemented to also include the transaction record log 214 and the passivated serial aspect 216. The transaction record log 214 is an ordered sequence of per-transaction records of transactions that were voted to commit (this includes transactions which have been voted to commit but which, in fact, rolled-back). The transaction record log 214 and the passivated serial aspect 216 guarantee that effects of transactions are durable. Durability is one of the ACID properties.

In practice, the transaction record log 214 is shared by more than one PPRM. Hence, the transaction record log 214 is a logical subset of the actual sequence of records in a log file.

The passivated serial aspect 216 is a file used for recovery. This file is a snap-shot of the state of the serial aspect 202 between transactions; the state where the last of a series of transactions is committed. This file is updated periodically and, apart from facilitating timely recovery, does not play a direct role in the transaction processing.

In performing their combined set of operations, the concurrent aspect 200 and the serial aspect 202 also fulfill the requirements of a distributed transaction processing two-phased commit protocol which guarantees atomic and consistent transactions. Moreover, as mentioned before, the class hierarchy also includes the escrow-locking dictionary 220. Hence, the escrow-locking multithreaded PPRM dictionary allows sharing of its dictionary resource 220 by the multiple concurrent transactions without compromising their ACID properties.

By reason of the class inheritance, the escrow-locking dictionary 220 inherits all the functions of the multithreaded PPRM super-class 190 in the class hierarchy of the dictionary 110. Moreover, the escrow-locking dictionary 220, includes 'lookup', 'insert' and 'delete' methods 310 for searching and performing the storage and lookup of dictionary entry values. In addition, the escrow-locking dictionary 220 has a state, which includes the dictionary resource 300 and a set of exclusive and shared locked mapping connection points and of mapping connection points dependent transactions 312 (as further described with reference to FIG. 8).

3. Escrow-Locking Multithreaded PPRM Dictionary Operations

In preventing the transactions cross-contamination, instead of automatically locking every resource accessed by each transaction, as is done in conventional systems, the present invention uses escrow-locking. More specifically, the escrow-locking dictionary 220 need not be locked entirely for every transaction. Rather, the escrow-locking dictionary 220 may be locked partially leaving other objects therein available for access.

To shield transactions during storage and lookup operations, the escrow-locking dictionary 220 employs exclusive and shared locks by invoking internal (private) methods 310 including get-exclusive-lock, get-shared-lock, release-exclusive-lock and release-shared-lock. The exclusive and shared locks, provide exclusive and shared locking of mapping connection points in the dictionary resource 300 and prevent transaction cross-contamination. Additionally, the escrow-locking dictionary 220 keeps track of exclusive and shared locks, on a per-transaction basis, as part of its state using the set of exclusive and shared locked mapping connection points and of mapping connection points dependent transactions 312.

It is noted that this escrow-locking mechanism is invoked when the concurrent aspect 200 performs the storage and lookup operations because, by design, the concurrent aspect 200 services multiple concurrent transactions. It is further noted that, in locking particular mapping connection points, the corresponding entries are not necessarily blocked. Rather, these entries may be accessed via other mapping connection points associated with other keys.

Figure 7:
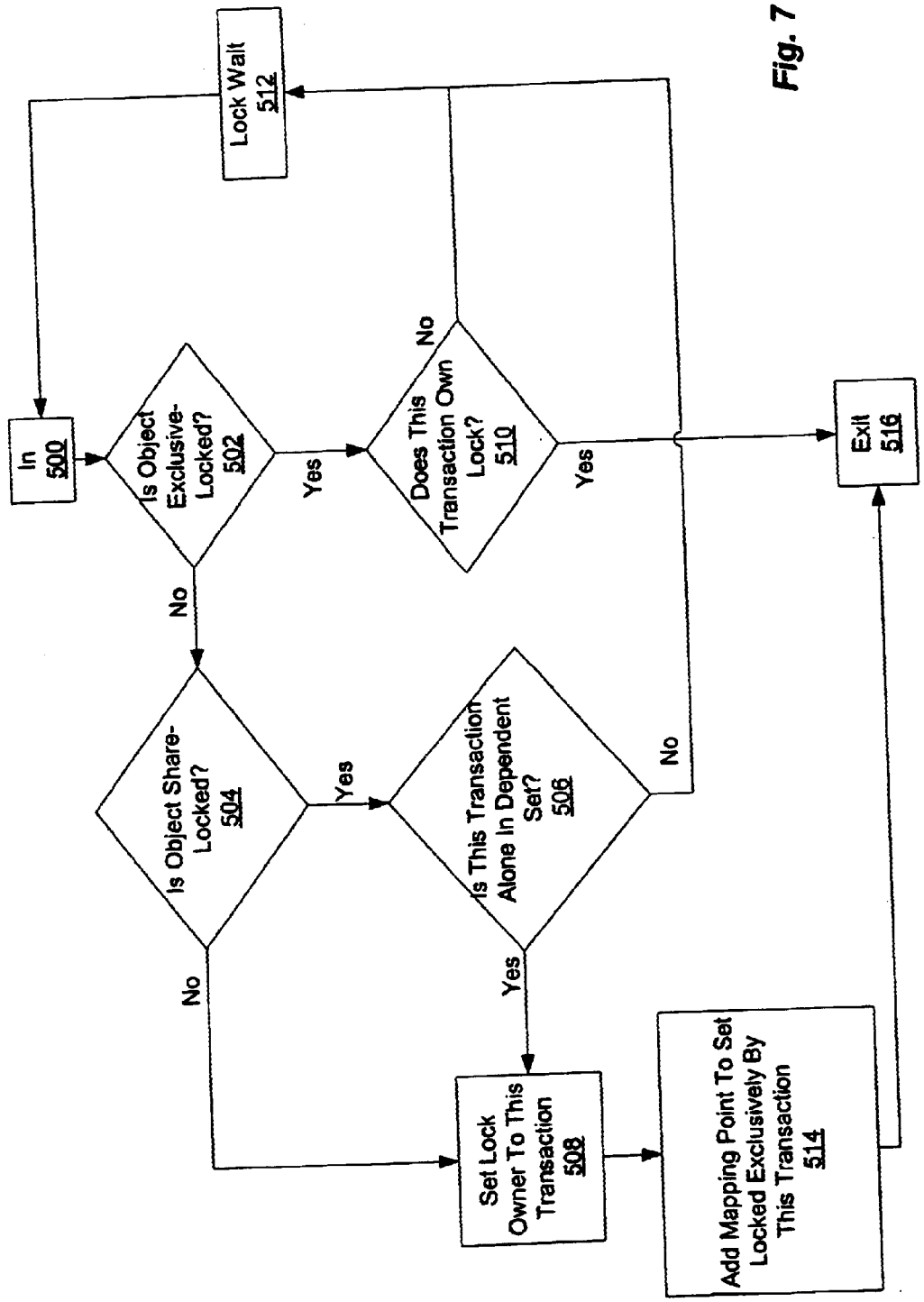
FIG. 7 is a flow diagram of a method for getting an exclusive lock in accordance with a preferred embodiment of the invention.

FIG. 7 is a flow diagram of the method get-exclusive-lock-on-mapping-connection-point in accordance with a preferred embodiment of the invention (this method has been and is hereafter referred to as the "get-exclusive-lock"). Fundamentally, the method get-exclusive-lock acquires exclusive access to the mapping connection point with respect to which it is invoked.

When the concurrent aspect invokes the 'insert' method, the escrow-locking dictionary, in turn, starts the Get-exclusive-lock via step 500. Get-exclusive-lock follows by determining if the mapping connection point is exclusive locked, via step 502. If, via step 502, it is determined that the object is exclusive locked and it is further determined, via step 510, that the currently serviced transaction owns the exclusive lock, then get-exclusive-lock exits, via step 516. If, on the other hand, it is determined, via step 510, that the currently serviced transaction does not own the exclusive lock, then get-exclusive-lock returns to the determining step 502 after it waits, via step 512, until the current exclusive lock owned by a different transaction is released, or until time-out is reached (not shown).

It is noted that a lock-wait 512 is invoked in all cases where a transaction must wait for other transactions to release their exclusive, or shared, lock. The lock-wait 512 waits for an event indicating that the mapping connection point has been released. A time-out out event will cause failure of the operation and, in turn, a rollback of the identified transaction.

If, via step 502, it is determined that the mapping connection point object is not exclusive locked, then it is further determined whether the mapping connection point is shared locked, via step 504. Both determinations are made by reference to either one or both sets of exclusive and shared locked mapping connection points.

If, via steps 504 and 506, respectively, it is determined that the mapping connection point object is not shared locked or that the currently serviced transaction is the only one being included in the mapping connection point's dependent transactions set, then the currently serviced transaction asserts an exclusive lock and sets an indication that it owns this lock, via step 508. The exclusive locked mapping connection point object is added to the set of exclusively locked mapping connection points for this transaction, via step 514. Thereafter, get-exclusive-lock exits, via step 516.

Figure 8:
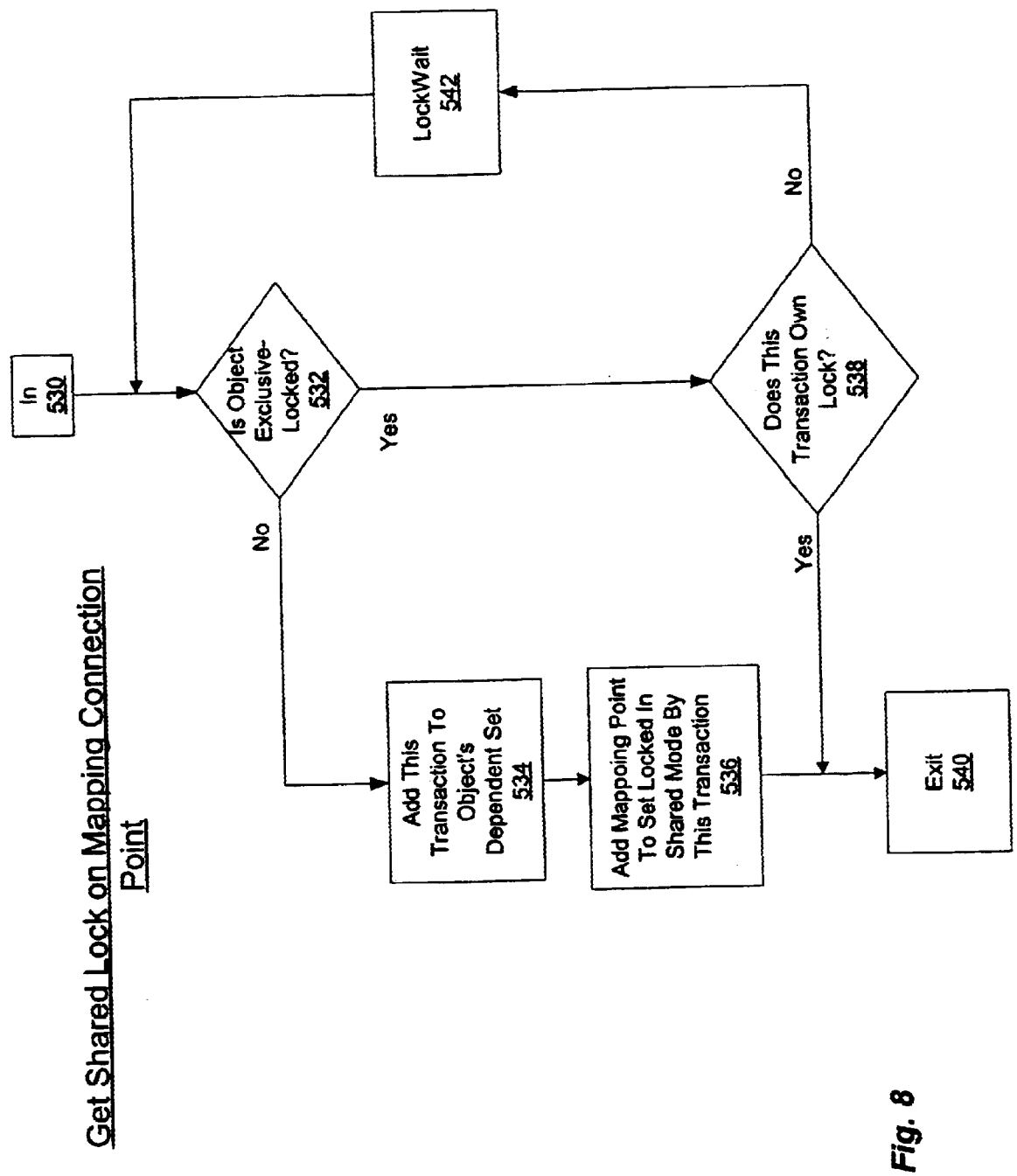
FIG. 8 is a flow diagram of a method for getting a shared lock in accordance with a preferred embodiment of the invention.

FIG. 8 is a flow diagram of the method get-shared-lock-on-mapping-connection-point in accordance with the preferred embodiment of the invention (this method has been and hereafter is referred to as the "get-shared-lock"). Fundamentally, get-shared-lock adds the requesting transaction to the set of transactions which share the lock and may depend on the mapping connection point state not to change unless they change it themselves.

Because shared locks may be held by multiple transactions, they are represented as a set of dependent transactions where a non-empty set indicates that the mapping connection point is shared locked, i.e., locked in a shared mode. It is noted that a transaction which holds a shared lock alone and is the only transaction on the mapping connection point's dependent list can upgrade the shared lock to an exclusive lock.

Get-shared-lock is started by the escrow-locking dictionary when the concurrent aspect invokes the 'lookup' method. After entering get-shared-lock, via step 530, it is determined if the mapping connection point object is exclusive locked, via step 532. If so, it is further determined, via step 538, if the currently serviced transaction owns the exclusive lock. Get-shared-lock will have to wait, via step 542, before returning to the determining step 532 if another transaction owns the mapping connection point exclusive lock. Conversely, get shared-lock exits, via step 540, if it owns the exclusive lock on the mapping connection point.

If, via step 532, it is determined that the mapping connection point object is not exclusive locked, then the currently serviced transaction is added to the mapping connection point's dependent set, via step 534. Moreover, the mapping connection point is added to the set of shared locked mapping connection points for this transaction, via step 536. Thereafter, get-shared-lock exits, via step 540.

Get-shared-lock fails, for example, if it times out. In that case, it causes the transaction to rollback and it may return a time-out indication. Conversely, get-shared-lock may return a confirmation indicating that it succeeded.

The method release-exclusive-lock (not illustrated) resets to 'not owned', or 'null' the indication that the identified transaction owns the lock, and removes the mapping connection point from the set of exclusive locked mapping connection points. The method release-shared-lock (not illustrated) removes the identified transaction from the set of mapping connection point's dependent transactions, and removes this mapping connection point from the set of shared locked mapping connection points.

Figure 9:
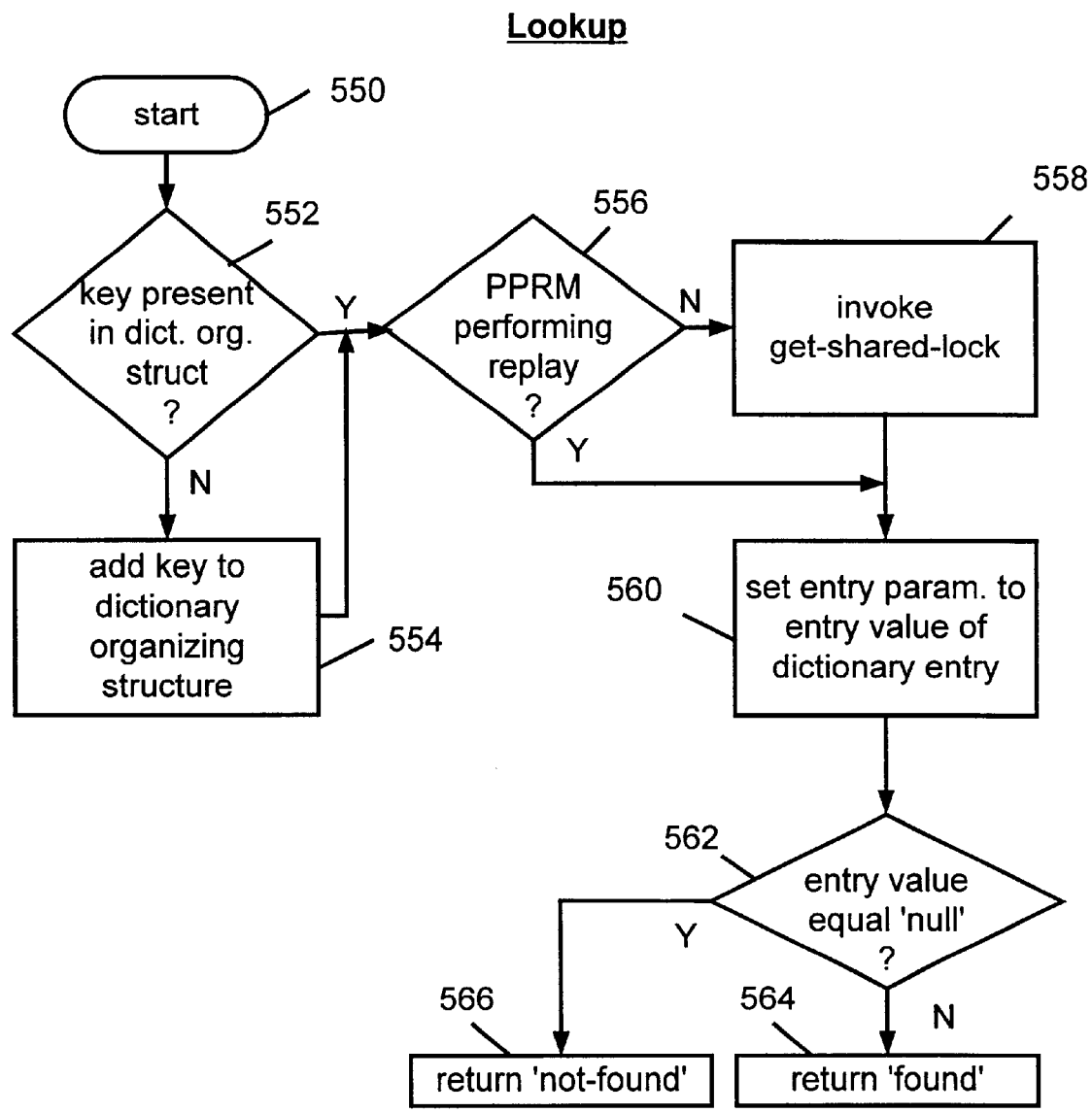
FIG. 9 is a flow diagram of a 'lookup' method in accordance with a preferred embodiment of the invention.

The storage and lookup application-level operations include inserting, lookup and deletion of dictionary entry values. FIG. 9, is a flow diagram of the escrow-locking dictionary method 'lookup' in accordance with the preferred embodiment of the invention. The method 'lookup' is implemented to receive a key value parameter of a key type and use the key value which represents a key in order to find a dictionary entry. The lookup operation will wait if there is a conflicting transaction in progress, i.e., if the same key is being linked with a different entry.

Once 'lookup' is invoked, via step 550, it is determined if the key is already present in the dictionary organizing structure, via step 552, and if not, the key is added to the dictionary organizing structure, via step 554. Next, it is determined, via step 556, whether the dictionary, which is implemented as an escrow-locking multithreaded PPRM dictionary, is performing a transaction replay and, if not, the get-shared-lock method is invoked, via step 558, in order to shield the transaction that performs this operation. If, on the other hand, transaction replay is being performed, the step 558 of invoking the get-shared-lock is skipped since the mapping connection point has been previously locked in a shared mode by this transaction in the concurrent aspect. It is noted that a transaction replay involves having the serial aspect perform a forward-play of an identified transaction.

In either case, the lookup operation proceeds next to set an entry parameter, via step 560. The entry parameter is of an entry type and it is set, via step 562, to the entry value of the dictionary entry if found, or to 'null' (or 'no entry') if the dictionary entry is not found. In addition, 'lookup' returns, via step 564, an enumerated type result of 'found' if the lookup operation is successful and, via step 566, a 'not-found' result if the lookup operation is unsuccessful.

Figure 10:
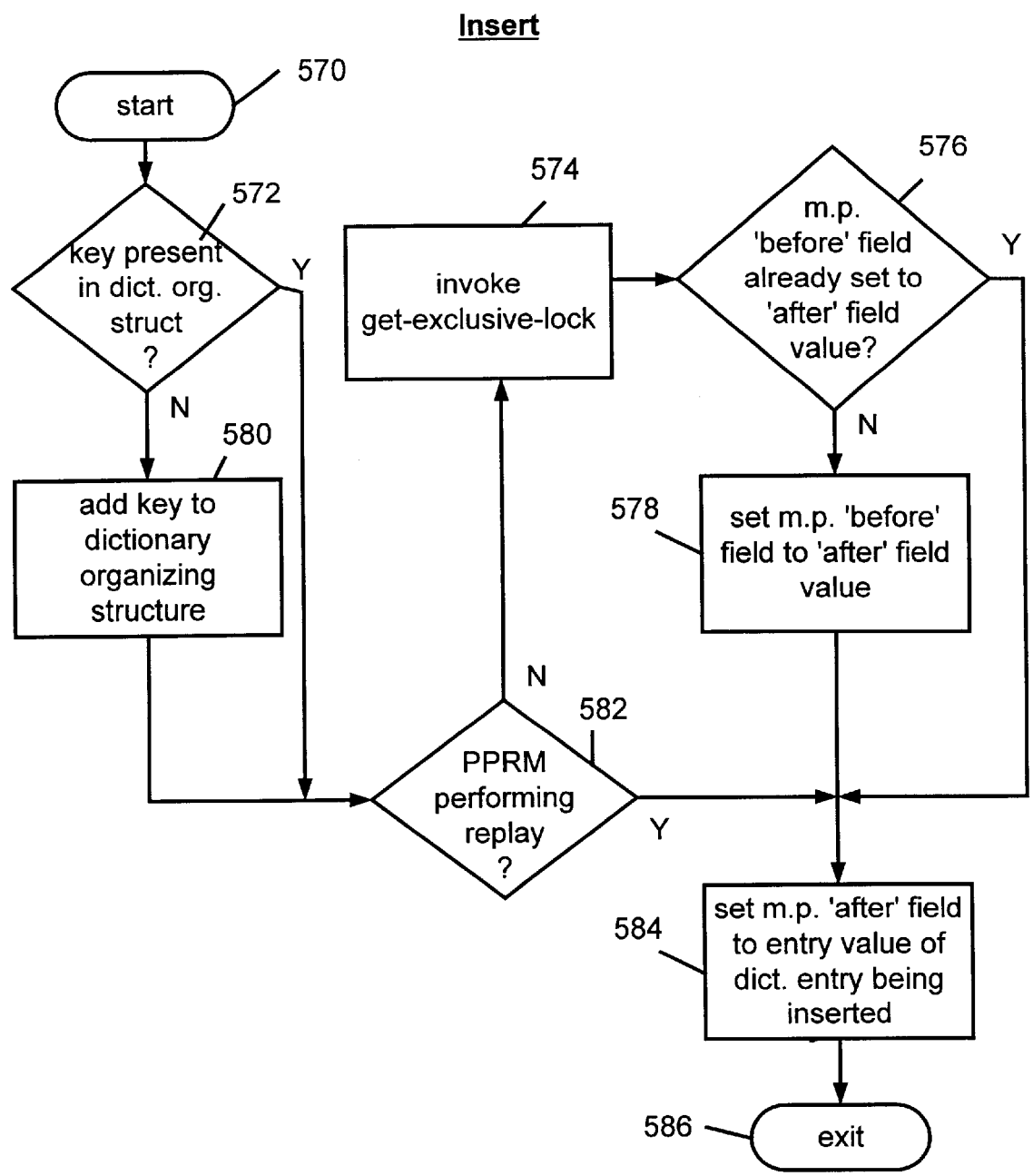
FIG. 10 is a flow diagram of an 'insert' method in accordance with a preferred embodiment of the invention.

FIG. 10 is a flow diagram of the escrow-locking dictionary method 'insert' in accordance with the preferred embodiment of the invention. Essentially, 'insert' establishes a mapping connection within the escrow-locking dictionary between a key and an entry. If the mapping connection already exists for the specified key it will be overwritten. This operation will wait if there is a conflicting transaction in progress. Once the method 'insert' is invoked, via step 570, insert operations either succeed or fail and cause the serviced transaction to rollback.

'Insert' receives as parameters a key value of the key type representing a key and an entry value of the entry type representing a dictionary entry. Insert uses the key value to determine, via step 572, if the key is present in the dictionary organizing structure. If the key is not present in the dictionary organizing structure, 'insert' adds the key to the dictionary organizing structure, via step 580.

Then 'insert' proceeds to determine, via step 582, whether the dictionary, which is implemented as an escrow-locking multithreaded PPRM dictionary, is performing a transaction replay. It is again noted that a transaction replay involves having the serial aspect perform a forward-play of an identified transaction. If transaction replay is not performed, then, as before, the method get-exclusive-lock is invoked, via step 574, in order to shield the transaction that performs this operation.

If the transaction replay is being performed, the step 574 of invoking the get-shared-lock is skipped. In this case, the 'after' field of this mapping connection point is set to the entry value which represents the dictionary entry being inserted (see FIG. 5). Thereafter, the insert operation exits, via step 586.

After control returns from get-exclusive-lock (step 574) to 'insert', it is determined whether the 'before' field of the mapping connection point has been set to the entry value which represents the dictionary entry previously inserted (in preparation for a roll-back if needed), via step 576. If the 'before' field has not been set already to the entry value which represents the previously inserted dictionary entry,it is set to this entry value by setting it to the value of the 'after' field, via step 578. The foregoing treatment of the 'before' field is followed by setting, via step 584, the 'after' field of the mapping connection point to the entry value which represents the dictionary entry being inserted. Thereafter, the insert operation end, via step 586.

Figure 11:
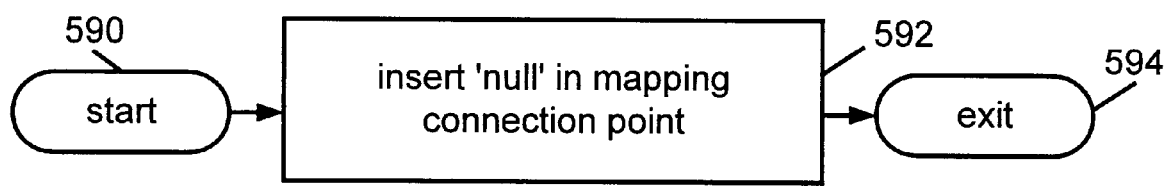
FIG. 11 is a flow diagram of a 'delete' method in accordance with a preferred embodiment of the invention.

FIG. 11, is a flow diagram of the method 'delete' in accordance with the preferred embodiment of the invention. Once invoked and entered, via step 590, this method essentially removes the connection between the key and the dictionary entry. To that end, 'delete' receives as parameters a key value of the key type representing the key and an entry value of the entry type representing the dictionary entry. 'Delete' uses these values to point to the mapping-connection-point which is then set to 'null' via step 592, thereby eliminating this key-to-entry relationship. 'Delete' exits via step 594.

Figure 12:
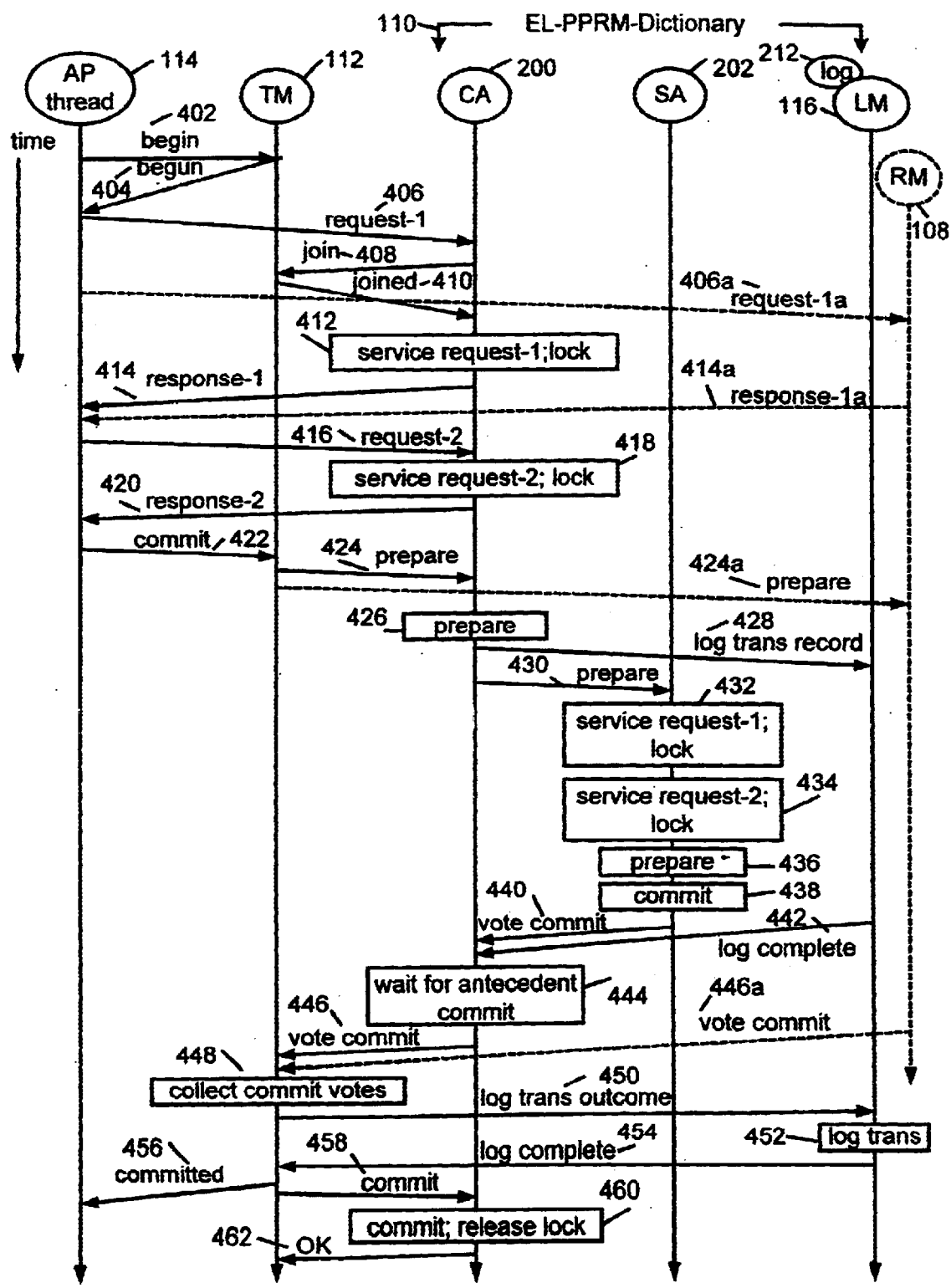
FIG. 12 is a flow diagram illustrating a timed sequence of transaction operations performed as a unit of work in accordance with a preferred embodiment of the invention.

In order to better understand the operations of the dictionary which is implemented as an escrow-locking multithreaded PPRM dictionary, the processing steps of a transaction are hereafter described in detail. FIG. 12, is a flow diagram illustrating a timed sequence of transaction operations performed as a unit of work in accordance with a preferred embodiment of the invention.

It is noted that, although the following simplified description illustrates the processing of a single transaction, the dictionary in accordance with the invention is configured to support multiple concurrent transactions. It is further noted that, without departing from the scope and spirit of the invention, this timed sequence may be modified on the basis of the type and number of operations (e.g., lookup, insert or delete) as well as the configuration of the distributed transaction processing system (e.g. the number and types of the special and conventional RMs).

It may be recalled that the preferred embodiment of a distributed transaction processing system in which the escrow-locking multithreaded PPRM dictionary 110 is implemented, is characterized by the application 114, the TM 112, the concurrent and serial aspects 200 and 202, respectively, the transaction log 212 and TM 116, possibly, additional RMs, e.g., 108. It may be also recalled that each instance of the application 114 may be a single-threaded process or, more typically, a multithreaded process.

The illustrated timed sequence of transaction operations begins with the application thread 114 declaring a new transaction by sending to the TM 112 a transaction begin request message, via step 402. The TM 112 responds by assigning a transaction-id to this transaction and sending a transaction begun reply to the application thread 114, via step 404. Until the transaction commits, via step 454, or rolls back (not shown), all operations from here on are part of the new transaction which is uniquely identified by the transaction-id.

Using this transaction-id as an identifier, a first application-level operation request message, request-1, is then sent by the application thread 114 to the concurrent aspect 200, via step 406. Request-1 may be a request to perform a lookup, insert or delete operation. In turn, the concurrent aspect 200 sends to the TM 112 a join request message, via step 408, telling the TM 112 that the escrow-locking multithreaded PPRM dictionary 110 wants to participate in the identified transaction's commit or rollback operations.

Typically, but not necessarily, several special and conventional RMs, e.g. 110 and 108, join the transaction. For example, the application thread 114 may send an operation request message, request-1a, to RM 108. This will prompt the RM 108 to also send a join request message (not shown) to the TM 112 telling the TM 112 that it wants to participates in the identified transactions' commit or rollback operations.

Returning the focus to the escrow-locking multithreaded PPRM dictionary 110, once its concurrent aspect 200 receives a joined reply message from the TM 112, via step 410, the concurrent aspect 200 is ready to service request-1, via step 412. To that end, in servicing requests for application-level operations such as lookup or insert, the concurrent aspect 200 causes the escrow-locking dictionary to invoke the get-shared-lock or get-exclusive-lock methods, respectively, in order to shield the identified transaction and guarantee its ACID properties.

When done, the concurrent aspect 200 sends to the application thread 114 a response-1 message, via step 414, indicating that it serviced request-1. It should be noted that the value returned, such as, for example, 'not-found'/'found', depends on the operation being performed and its success or failure. It may also be recalled that a failure (not shown) causes the identified transaction to rollback and undo the results of the operations performed in its behalf.

In this exemplary sequence, this application thread 114 sends a second application-level operation request, request-2, to the concurrent aspect 200. The concurrent aspect 200 responds by servicing request-2, via step 418, as it did with respect to request-1, including, if applicable, locking exclusively or in a shared mode the corresponding mapping connection point. When done, the concurrent aspect 200 sends to the application thread 114 a response-2 message.

When all the application-level operations have been serviced, the application thread 114, sends a commit request message to the TM 112, via step 422. In response, the TM 112 sends a prepare message to the concurrent aspect 200 which, in turn, invokes its 'prepare' method, via step 426. As previously explained, the timed sequence of operations for this transaction is recorded by the concurrent aspect 200 in a per-transaction record. Accordingly, after the 'prepare' method is invoked, the concurrent aspect 200 sends a log request message to the LM 116, via step 428, for logging in the transaction log 212 the per-transaction record for the identified transaction.

The concurrent aspect 200 additionally sends a prepare message to the serial aspect 202, via step 430. Using the per-transaction record for the identified transaction, the serial aspect then deterministically forward-plays the entire transaction, via steps 432 and 434. In other words, the serial aspect 202 forward-plays the transaction operations in the order in which they where processed by the concurrent aspect 200. The serial aspect 202 next invokes its 'prepare' and then 'commit' methods, via steps 436 and 438, respectively. When done, the serial aspect 202 sends a vote to commit message to the concurrent aspect 200, via step 440. The concurrent aspect 200 additionally receives a log complete message from the LM 116, via step 442. The concurrent aspect 200, having waited, via step 444, for the antecedent commit (from a preceding transaction), is now prepared to send a vote to commit message to the TM 112, via step 446.

If applicable, the TM 112 also receives a vote to commit message from additional RMs, e.g., 108, via step 446a. Next, the TM 112 collects the commit votes received from all the special and conventional RMs that were joined and participated in the identified transaction, including the escrow-locking multithreaded PPRM dictionary 110 and, if applicable, RM 108. The TM 112 then sends a log transaction outcome request message to the LM 116, via step 450. The LM 116 responds by logging the transaction outcome, via step 452, and sending a log complete message to the TM 112, via step 454.

At this point the TM 112 declares that the transaction is committed by sending a committed message to the application 114, via step 456. The TM 112 then sends a commit request message to the concurrent access 200, via step 458. The concurrent aspect 200, via step 460, invokes its 'commit' method and causes the escrow-locking dictionary to release the locks owned by this transaction through invocation of the release-exclusive-lock and/or release-shared-lock methods. When done, the concurrent aspect sends an OK message, via step 462, to the TM 112. By this process, each one of the concurrent transactions that share and are serviced by the foregoing escrow-locking multithreaded PPRM dictionary is executed as a unit of work whose ACID properties are maintained while, at the same time, fulfilling the requirements of the distributed transaction processing two-phase commit protocol.

4. Summary

In summary, as an escrow-locking multithreaded PPRM dictionary, the dictionary extends the semantics of ACID properties to the process state of a process pair, and performs this work concurrently on behalf of multiple transactions by using the two-phase commit protocol and escrow-locking. Namely, the escrow-locking multithreaded PPRM dictionary services multiple concurrent transactions without compromising their ACID properties, wherein a plurality of these transactions may perform non-conflicting operations simultaneously on the dictionary, and wherein conflicting transactions are blocked to allow completion of preceding conflicting transactions.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A multiple transaction processing system, comprising:
   an escrow-locking multithreaded process-pair resource manager (PPRM) dictionary responsive to multiple concurrent transactions, the
   dictionary including:
      a dictionary resource;
      a concurrent aspect for concurrently servicing the multiple concurrent transactions, the concurrent aspect having an instance of the escrow-locking dictionary; and
      a serial aspect for serializing the multiple concurrent transactions, the serial aspect having an instance of the escrow-locking dictionary;
      wherein the escrow-locking dictionary allows multiple concurrent transactions of the concurrent aspect and serial transactions of the serial aspect to share the dictionary resource and to perform operations on behalf of the multiple concurrent transactions without compromising the atomic, consistent, isolated and durable (ACID) transaction properties.

2. A system according to claim 1, wherein the dictionary is using exclusive and shared locking in a two-phased protocol extending the ACID properties to a process state of the process pair.

3. A system according to claim 1, in which the concurrent aspect participates in each transaction to which the process pair is responsive, the concurrent aspect configured to construct for each such transaction a per-transaction record.

4. A system according to claim 3, in which the serial aspect participates in each transaction to which the process pair is responsive, the serial aspect being configured to perform a deterministic forward-play of each transaction using as an input the respective per-transaction record.

5. A system according to claim 1, wherein the serialization of transactions by the serial aspect guarantees that effects of the transactions are being isolated.

6. A system according to claim 1, in which at least one instance of the escrow-locking dictionary is a copy of another, and, combined, two copies of the escrow-locking dictionary maintain an appearance of a single virtual dictionary.

7. A system according to claim 1, wherein the escrow-locking multithreaded PPRM dictionary is adapted to perform a distributed transaction processing two-phased commit protocol.

8. A system according to claim 1, wherein the concurrent aspect and serial aspect include methods for responding to request messages which determine the operations to be performed.

9. A system according to claim 1, wherein the concurrent aspect and serial aspect include prepare, commit and rollback methods for responding to request messages which determine the operations to be performed including fulfilling the requirements of a distributed transaction processing two-phased commit protocol.

10. A system according to claim 1, wherein the escrow-locking multithreaded PPRM dictionary further includes:
    a transaction record log for holding an ordered sequence of per-transaction records for transactions that have been voted to commit, wherein the transaction record log is shared by more than one PPRM dictionary.

11. A system according to claim 1, wherein the escrow-locking multithreaded PPRM dictionary further includes:
    a passivated serial aspect for maintaining a snap-shot of a state of the serial aspect between transactions, the passivated aspect being periodically updated and used for recovery.

12. A system according to claim 1, in which the concurrent aspect participates in each transaction to which the process pair is responsive and is configured to construct for each such transaction a per-transaction record, each per-transaction record including a time-sequenced set of input messages, output messages and determining factors, the input messages being recorded in the order in which they were received by the concurrent aspect, the output messages and determining factors being recorded in the order of being generated in response to the respective input messages.

13. A system according to claim 12, wherein, by retrieving the determining factors, the serial aspect is able to deterministically forward-play each of the respective transactions which, originally, were performed non-deterministically by the concurrent aspect.

14. A system according to claim 1, wherein the serial aspect includes a transaction record into which the serial aspect loads a per-transaction record created by the concurrent aspect for each transaction to which the process pair is responsive, the serial aspect using the per-transaction record as an input to deterministically forward-play each such transactions.

15. A system according to claim 1, wherein the escrow-locking produces exclusive and shared locks via methods in the escrow-locking dictionary including get-exclusive-lock, get-shared-lock, release-exclusive-lock and release-shared-lock.

16. A system according to claim 1, wherein the escrow-locking dictionary further includes methods and a set of exclusive and shared locked mapping connection points and of shared locked mapping connection points' dependent transactions, the methods for performing application-level operations and for providing the escrow-locking.

17. A system according to claim 16, wherein the methods for performing the application-level operations include lookup, insert and delete, and wherein the methods for providing the escrow-locking include methods for providing the exclusive and shared locks.

18. A system according to claim 1, wherein the dictionary resource includes a dictionary organizing structure, mapping connection points and dictionary entries, the mapping connection points providing a relationship between the dictionary organizing structure and the dictionary entries.

19. A system according to claim 18, wherein the dictionary organizing structure is formed as one of a binary tree of keys and a hash table of keys.

20. A system according to claim 18, wherein the dictionary entries are included in the dictionary organizing structure so that the mapping connection points are unnecessary to provide the relationship.

21. A system according to claim 18, wherein each of the mapping connection points includes a 'before' field and an 'after' field for maintaining entry values representing dictionary entries before and after the transaction, respectively.

22. A data processing system for providing access to a dictionary, the data processing system operating within the framework of distributed transaction processing, the data processing system comprising:
   one or more application programs;
   at least one resource manager (RM) receiving and responding to requests from the applications, the at least one RM including as a transaction-protected resource the dictionary which is a special RM implemented as an escrow-locking multithreaded process pair resource manager (PPRM) dictionary, a process pair in the PPRM being responsive to multiple concurrent transactions and including:
      a concurrent aspect which is a front-end multi threaded process of the process pair for concurrently servicing the multiple concurrent transactions;
      a serial aspect which is a single-threaded process of the process pair for serializing the multiple concurrent transaction; and
      an escrow-locking, dictionary, each of the concurrent aspect and the serial aspect having its own copy of the escrow-locking dictionary, the escrow-locking dictionary having a dictionary resource and using escrow-locking for allowing the multiple concurrent transactions to share the dictionary resource, the dictionary performing operations on behalf of the multiple concurrent transactions without compromising their atomic, consistent, isolated and durable (ACID) properties;
   a process monitor monitoring the at least one RM, the process monitor restarting any of the at least one RM if it stops for any reason;
   a transaction manager orchestrating transactions operations in response to begin transaction messages from the application programs, the transaction manager assigning a unique transaction identification to each transaction and tracking which of the at least one RM participates in each transaction; and
   a log manager interacting with the transaction manager for recording transaction messages and outcomes.

23. A data processing system in accordance with claim 22, wherein the dictionary is preventing a multiple concurrent transactions cross-contamination and fulfilling the requirements of a distributed transaction processing two-phased commit protocol.

24. A data processing system in accordance with claim 22, the data processing system further including:
   a processor;
   an input device interacting with the processor;
   an output device interacting with the processor;
   a durable storage device interacting with the processor for maintaining durable data including a transaction log received via the log manager; and
   a memory device interacting with the processor for performing the distributed transaction processing.

25. A method for providing access to a dictionary in a data processing system operating in a distributed transaction processing framework, the method comprising:
   providing the dictionary in the data processing system;
   providing in the dictionary exclusive and shared locking in response to access request messages;
   using in the dictionary a distributed transaction processing two-phased protocol to process the access request messages;
   keeping track in the dictionary of operations performed in response to the access request messages on behalf of each of one or more concurrent transactions; and
   keeping track in the dictionary of dictionary entries being accessed so that conflicting operations may be blocked until a transaction that perform these operations has completed them, the escrow-locking multithreaded PPRM dictionary servicing each of the multiple concurrent transactions without compromising their atomic, consistent, isolated and durable (ACID) properties.

26. A method for providing access to a dictionary in a data processing system operating in a distributed transaction processing framework, the method comprising:
   providing the dictionary in the data processing system, the dictionary including a concurrent aspect, a serial aspect and an escrow-locking dictionary in each of the concurrent aspect and the serial aspect;
   providing in the dictionary exclusive and shared locking in response to access request messages;
   using in the dictionary a distributed transaction processing two-phased commit protocol to process the access request messages;
   keeping track in the dictionary of the operations performed in response of the access request messages on behalf of each of one or multiple concurrent transactions, the access request messages prompting a recording of the operations and reply messages in a per-transaction record in the order in which they are addressed by the concurrent aspect;
   providing the per-transaction record for each transaction to the serial aspect, the serial aspect serializing and replaying the multiple concurrent transactions to which the concurrent aspect is responsive using as an input their respective per-transaction records; and
   keeping track in the dictionary of dictionary entries being accessed so that conflicting operations may be blocked until a transaction that perform these operations has completed them, the dictionary servicing each of the multiple concurrent transactions without compromising their atomic, consistent, isolated and durable (ACID) properties.

27. A method in accordance with claim 26, wherein the exclusive and shared locking is provided via escrow-locking dictionary methods including get-exclusive-lock, get-shared-lock, release-exclusive-lock and release-shared-lock.

28. A method in accordance with claim 27, wherein the get-exclusive-lock is for providing ownership of an exclusive lock to an identified transaction, the get-exclusive-lock including:

determining if a mapping connection point is exclusively locked;

determining, if it is determined that the mapping connection point is exclusively locked, whether the identified transaction owns the exclusively locked mapping connection point;

waiting for one of a time-out or a release by a different transaction of the exclusively locked mapping connection point if the exclusively locked mapping connection point is not owned by the identified transaction;

determining if the mapping connection point is shared locked;

waiting for one of a time-out or a release by a different transaction of the mapping connection point if the mapping connection point is shared locked but is not owned by the identified transaction;

asserting exclusive ownership of the mapping connection point by the identified transaction if the mapping connection point is not locked or if the mapping connection point is shared locked but the identified transaction alone is in the mapping connection point's dependent transactions set; and adding the mapping connection point to a set of exclusively locked mapping connection points if the mapping connection point is not locked or if the mapping connection point is shared locked but the identified transaction alone is in the mapping connection point's dependent transactions set.

29. A method in accordance with claim 27, wherein the get-shared-lock is for providing ownership of a shared lock to an identified transaction, the get-shared-lock including:

determining if a mapping connection point is exclusively locked;

determining, if it is determined that the mapping connection point is exclusively locked, whether the identified transaction owns the exclusively locked mapping connection point;

waiting for one of a time-out or a release by a different transaction of the exclusively locked mapping connection point if the exclusively locked mapping connection point is not owned by the identified transaction;

adding the mapping connection point to a set of shared locked mapping connection points if the mapping connection point is not exclusively locked; and adding the identified transaction to a mapping connection point's dependent transactions set.

30. A method in accordance with claim 27, wherein the release-exclusive-lock is for releasing ownership of an exclusive lock by an identified transaction, the release-exclusive-lock including:

negating an indication of exclusive ownership by the identified transaction; and removing the mapping connection point from the set of exclusively locked mapping connection points.

31. A method in accordance with claim 27, wherein the release-shared-lock is for releasing ownership of a shared lock by an identified transaction, the release-shared-lock including the steps of:

removing identified transaction from a mapping connection point's dependent transactions set; and removing the mapping connection point from the set of shared locked mapping connection points.

32. A method in accordance with claim 26, wherein the escrow-locking multithreaded PPRM dictionary includes an escrow-locking dictionary, the escrow-locking dictionary including a dictionary resource having a dictionary organizing structure and dictionary entries, and wherein access request messages are processed via escrow-locking dictionary methods including 'lookup', 'insert', and 'delete'.

33. A method in accordance with claim 32, wherein the 'lookup' includes:

determining if an identified key is present in a dictionary organizing structure;

adding the identified key to the dictionary organizing structure if the key is not present there;

determining whether the escrow-locking PPRM dictionary is performing a transaction replay;

invoking get-shared-lock if the escrow-locking PPRM dictionary is not performing the transaction replay;

setting an entry parameter to an entry value of a dictionary entry; and returning one of a 'found' and 'not found' result based on whether the dictionary entry is found or not found.

34. A method in accordance with claim 32, wherein the 'insert' includes the steps of:

determining if an identified key is present in a dictionary organizing structure;

adding the identified key to the dictionary organizing structure if the key is not present there;

determining whether the escrow-locking PPRM dictionary is performing a transaction replay;

invoking get-exclusive-lock if the escrow-locking PPRM dictionary is not performing the transaction replay;

setting a 'before' field of a mapping connection point to an 'after' field value of the mapping connection point if the mapping connection point's 'before' field is not already set to the 'after' field value of the mapping connection point; and setting the mapping point 'after' field value to an entry value of a dictionary entry being inserted.

35. A method in accordance with claim 32, wherein the 'delete' includes setting a mapping connection point identified by a key to 'null'.

36. A method for providing access to a dictionary in a data processing system operating in a distributed transaction processing framework, the dictionary containing a plurality of dictionary entries, the method comprising:

providing the dictionary in the data processing system, the dictionary having a concurrent aspect and a serial aspect as a process pair;

using exclusive and shared locking in the dictionary;

keeping track in the dictionary of dictionary entries being accessed so that conflicting operations may be blocked until a transaction that perform these operations has completed them; and executing in the dictionary a distributed transaction processing two-phased commit protocol, including:

beginning a transaction in response to a begin transaction message sent by an application to a transaction manager;

assigning a transaction-identification unique to the transaction, the transaction being thereafter identified thereby;

sending a join request message from the concurrent aspect to the transaction manager in response to a dictionary access request message received by the concurrent aspect from the application;

servicing the dictionary access request message by providing escrow-locking and creating a per-transaction record for the identified transaction;

repeating the servicing if during the identified transaction the application sends additional dictionary access request messages to the concurrent aspect;

sending from the concurrent aspect a prepare message to the serial aspect and a log request message to a log manager in response to a commit message from the application;

replaying in the serial aspect the entire identified transaction using as an input its respective per-transaction record;

sending a vote to commit message from the serial aspect to the concurrent aspect;

sending from the concurrent aspect to the transaction manager a vote to commit in response to the serial aspect's vote to commit message;

sending a committed message from the transaction manager to the application in response to the vote to commit message from the concurrent aspect;

releasing any exclusive and shared lock associated with the identified transaction; and committing the transaction, the identified transaction has been executed as a unit of work whose ACID (atomic, consistent, isolated and durable) properties have not been compromised while, at the same time, fulfilling the requirements of the distributed transaction processing two-phase commit protocol.

37. A computer program product having computer readable code embodied therein, configured to provide a dictionary in a data processing system operating in a distributed processing framework, comprising:

computer readable program code configured to provide the dictionary in the data processing system;

computer readable program code configured to provide the dictionary exclusive and shared locking in response to access request messages;

computer readable program code configured to use in the dictionary a distributed transaction processing two-phased protocol to process the access request messages;

computer readable program code configured to keep track in the dictionary of operations performed in response to the access request messages on behalf of each of one or more concurrent transactions; and computer readable program code configured to keep track in the dictionary of dictionary entries being accessed so that conflicting operations may be blocked until a transaction that perform these operations has completed them, the escrow-locking multithreaded PPRM dictionary servicing each of the multiple concurrent transactions without compromising their atomic, consistent, isolated and durable (ACID) properties.

38. A computer program product having computer readable code embodied therein, configured to provide a dictionary in a data processing system operating in a distributed processing framework, comprising:

computer readable program code configured to provide the dictionary in the data processing system;

computer readable program code configured to provide in the dictionary exclusive and shared locking in response to access request messages;

computer readable program code configured to use in the dictionary a distributed transaction processing two-phased commit protocol to process the access request messages;

computer readable program code configured to provide in the dictionary a per-transaction record for each transaction to a concurrent aspect of the escrow-locking multithreaded PPRM dictionary in the dictionary, of operation and reply messages, according to the access request messages on behalf of each of one or multiple concurrent transactions in the order addressed;

computer readable program code configured to provide a per-transaction record for each transaction to a serial aspect of the escrow-locking multithreaded PPRM dictionary, the serial aspect serializing and replaying the multiple concurrent transactions to which the concurrent aspect is responsive using the per-transaction record for the concurrent transactions as an input; and computer readable program code configured to keep track in the dictionary of dictionary entries being accessed so that conflicting operations may be blocked until a transaction that perform these operations has completed them, the dictionary servicing each of the multiple concurrent transactions without compromising their atomic, consistent, isolated and durable (ACID) properties.

39. An apparatus comprising:

a dictionary data structure stored on a computer readable medium, the dictionary data structure comprising a plurality of keys, a plurality of entries, and a plurality of mapping points, each key associated with one of the plurality of mapping points to provide a relationship between the key and a corresponding entry; and a multiple transaction processing system to hold a given mapping point in an escrow-lock for a given transaction, to perform dictionary operations for multiple transactions simultaneously, and to maintain one or more transactional ACID properties of the multiple transactions.

40. The apparatus of claim 39 wherein the escrow-lock further comprises a shared state escrow-lock associated with the transaction to prevent other transactions from changing the mapping point and to allow other transactions to hold the locked mapping point; and a record of transactions that hold the shared state escrow-lock for the mapping point.

41. The apparatus of claim 39 wherein the escrow-lock further comprises an exclusive state escrow-lock associated with the transaction to provide the transaction with exclusive access to the mapping point.

42. The apparatus of claim 39, wherein the multiple transaction processing system is configured to track operations of each transaction so that conflicting operations are prevented, and so that reverse operations of each transaction can be performed during a roll-back.

43. The apparatus of claim 40, wherein the multiple transaction processing system is configured to track operations by tracking the mapping points that have been locked in an exclusive state by the transaction, and by tracking the mapping points that have been locked in a shared state by the transaction.

44. The apparatus of claim 39 wherein the multiple transaction processing system is further configured to commit changes made by the operations of a given transaction so that the changes are recorded on a durable computer readable medium.

45. The apparatus of claim 39 wherein the multiple transaction processing system is further configured to rollback changes made by the operations of a given transaction so that changes made by the transaction are removed from the dictionary data structure.

46. The apparatus of claim 39 wherein the multiple transaction processing system is configured to process the multiple transactions in a pair of processes including a concurrent process to process the transactions concurrently; and a serial process to process the transactions serially.

47. The apparatus of claim 39 wherein one of the transactional properties comprises an atomic property of implementing either all changes made by a given transaction, or implementing none of the changes made by the given transaction.

48. The apparatus of claim 39 wherein one of the transactional properties comprises a consistent property of evaluating integrity constraints and committing only if all of the integrity constraints are met.

49. The apparatus of claim 39 wherein one of the transactional properties comprises an isolated property to detach other transactions from changes made by a given transaction until the given transaction commits.

50. The apparatus of claim 39 wherein one of the transactional properties comprises a durable property to preserve a change made by a transaction.

51. A method of performing operations on a dictionary data structure stored on a computer readable medium, the dictionary data structure comprising a plurality of keys, a plurality of entries, and a plurality of mapping points, each key associated with one of the plurality of mapping points so that the associated mapping point provides a relationship between the key and an entry of the plurality of entries; the method comprising:

holding a given mapping point in an escrow-lock for a given transaction;

performing dictionary operations for multiple transactions simultaneously; and maintaining the ACID properties of the multiple transactions.

52. The method of claim 51 wherein holding further comprises associating a shared state escrow-lock with the transaction and the mapping point;

preventing other transactions from changing the mapping point;

allowing other transactions to hold the locked mapping point; and recording transactions that hold the shared state escrow-lock for the mapping point.

53. The method of claim 51 wherein holding further comprises associating an exclusive state escrow-lock with the transaction and the mapping point; and providing the transaction with exclusive access to the mapping point.

54. The method of claim 51 further comprising tracking operations of each transaction; and preventing conflicting operations.

55. The method of claim 54 further comprising performing reverse operations of each transaction during a roll-back.

56. The method of claim 51 further comprising tracking the mapping points that have been locked in an exclusive state by the transaction; and tracking the mapping points that have been locked in a shared state by the transaction.

57. The method of claim 51 further comprising committing changes made by the operations of a given transaction so that the changes are recorded on a durable computer readable medium.

58. The method of claim 51 further comprising rolling-back changes made by the operations of a given transaction so that changes made by the transaction are removed.

59. The method of claim 51 further comprising processing the transactions concurrently; and processing the transactions serially.

60. The method of claim 51 wherein one of the transactional properties comprises an atomic property of implementing either all changes made by a given transaction, or implementing none of the changes made by the given transaction.

61. The method of claim 51 wherein one of the transactional properties comprises a consistent property of evaluating integrity constraints and committing only if all of the integrity constraints are met.

62. The method of claim 51 wherein one of the transactional properties comprises an isolated property to detach other transactions from changes made by a given transaction until the given transaction commits.

63. The method of claim 51 wherein one of the transactional properties comprises a durable property to preserve a change made by a transaction.

64. The method of claim 52, wherein holding further comprises determining that a mapping point is not exclusively locked by other transactions;

holding the transaction in a shared state for the transaction, and adding the transaction to the record of transactions that hold the shared state for the mapping point.

65. The method of claim 53, wherein holding further comprises determining that the mapping point is not exclusively locked;

determining that the mapping point is not held in a shared state by other transactions; and holding the mapping point in an exclusive lock for the transaction.

* * * * *